US009142056B1

(12) United States Patent
Baran et al.

(10) Patent No.: US 9,142,056 B1
(45) Date of Patent: Sep. 22, 2015

(54) MIXED-ORDER COMPOSITING FOR IMAGES HAVING THREE-DIMENSIONAL PAINTING EFFECTS

(75) Inventors: Ilya Baran, Zürich (CH); Johannes Schmid, Zürich (CH); Markus Gross, Uster (CH); Robert W. Sumner, Zürich (CH)

(73) Assignees: DISNEY ENTERPRISES, INC., Burbank, CA (US); ETH ZURICH (EIDGENOESSISCHE TECHNISCHE HOCHSCHULE ZURICH), Zurich (CH)

( * ) Notice: Subject to any disclaimer, the term of this patent is extended or adjusted under 35 U.S.C. 154(b) by 695 days.

(21) Appl. No.: 13/475,617

(22) Filed: May 18, 2012

Related U.S. Application Data

(63) Continuation-in-part of application No. 13/353,249, filed on Jan. 18, 2012, now Pat. No. 8,988,461.

(60) Provisional application No. 61/487,684, filed on May 18, 2011.

(51) Int. Cl.
*G06T 15/00* (2011.01)

(52) U.S. Cl.
CPC .................................. *G06T 15/00* (2013.01)

(58) Field of Classification Search
CPC .......... G02T 19/00; G02T 17/20; G02T 15/10
See application file for complete search history.

(56) References Cited

U.S. PATENT DOCUMENTS

| | | | | |
|---|---|---|---|---|
| 3,521,227 A * | 7/1970 | Izumi et al. | | 340/973 |
| 4,953,142 A * | 8/1990 | Rimmer | | 367/73 |
| 5,347,620 A * | 9/1994 | Zimmer | | 345/592 |
| 5,414,801 A * | 5/1995 | Smith et al. | | 345/419 |
| 5,611,036 A * | 3/1997 | Berend et al. | | 345/441 |
| 5,870,097 A * | 2/1999 | Snyder et al. | | 345/426 |
| 6,011,536 A * | 1/2000 | Hertzmann et al. | | 345/418 |
| 6,054,991 A * | 4/2000 | Crane et al. | | 345/420 |
| 6,064,771 A * | 5/2000 | Migdal et al. | | 382/232 |

(Continued)

OTHER PUBLICATIONS

Guo et al., "Point Set Surface Editing Techniques Based on Level-Sets", *Proceedings of the Computer Graphics International*, pp. 52-59; IEEE Computer Society Washington, DC, USA; 2004.

(Continued)

*Primary Examiner* — Devona Faulk
*Assistant Examiner* — Charles L Beard
(74) *Attorney, Agent, or Firm* — Kilpatrick Townsend & Stockton LLP

(57) ABSTRACT

Rendering 3D paintings can be done by compositing brush strokes embedded in space. Image elements are rendered into an image representable by a pixel array wherein at least some of the image elements correspond to simulated painting strokes. A method may include determining stroke positions in a 3D space, determining stroke orders, and for each pixel to be addressed, determining a pixel color value by determining strokes intersections with a view ray for that pixel, determining a depth order and a stroke order for intersecting fragments, each fragment having a color, alpha value, depth, and stroke order, assigning an intermediate color to each of the fragments, corresponding to a compositing of nearby fragments in stroke order, and assigning a color to the pixel that corresponds to a compositing of the fragments using the intermediate colors assigned to the fragments. The compositing may be done in depth order.

21 Claims, 20 Drawing Sheets

(56) References Cited

U.S. PATENT DOCUMENTS

| | | | | |
|---|---|---|---|---|
| 6,111,582 | A * | 8/2000 | Jenkins | 345/421 |
| 6,130,676 | A * | 10/2000 | Wise et al. | 345/619 |
| 6,266,064 | B1 * | 7/2001 | Snyder | 345/421 |
| 6,268,865 | B1 * | 7/2001 | Daniels et al. | 345/582 |
| 6,590,574 | B1 * | 7/2003 | Andrews | 345/419 |
| 6,690,371 | B1 * | 2/2004 | Okerlund et al. | 345/424 |
| 6,798,411 | B1 * | 9/2004 | Gorman et al. | 345/428 |
| 6,965,454 | B1 * | 11/2005 | Silverbrook et al. | 358/1.9 |
| 7,064,771 | B1 * | 6/2006 | Jouppi et al. | 345/614 |
| 7,190,376 | B1 * | 3/2007 | Tonisson | 345/629 |
| 7,382,378 | B2 * | 6/2008 | Levene et al. | 345/592 |
| 7,403,661 | B2 * | 7/2008 | Curry et al. | 382/232 |
| 7,415,154 | B2 * | 8/2008 | Hoogendijk | 382/166 |
| 7,746,344 | B2 * | 6/2010 | Grabli et al. | 345/473 |
| 7,924,284 | B2 * | 4/2011 | Ewanchuk et al. | 345/443 |
| 8,253,757 | B2 * | 8/2012 | Yang et al. | 345/600 |
| 8,345,998 | B2 * | 1/2013 | Malik et al. | 382/239 |
| 8,373,715 | B1 | 2/2013 | Ryu | |
| 8,874,722 | B2 * | 10/2014 | Gooding et al. | 709/224 |
| 2002/0130864 | A1 * | 9/2002 | Perry et al. | 345/421 |
| 2002/0175925 | A1 * | 11/2002 | Lie | 345/690 |
| 2003/0222868 | A1 * | 12/2003 | Raskar et al. | 345/419 |
| 2004/0125103 | A1 * | 7/2004 | Kaufman et al. | 345/419 |
| 2005/0093874 | A1 * | 5/2005 | Levene et al. | 345/582 |
| 2005/0151755 | A1 * | 7/2005 | Bentley et al. | 345/619 |
| 2005/0168476 | A1 * | 8/2005 | Levene et al. | 345/582 |
| 2005/0231516 | A1 * | 10/2005 | Zimmer | 345/531 |
| 2005/0248560 | A1 * | 11/2005 | Agrawala et al. | 345/418 |
| 2006/0072828 | A1 * | 4/2006 | Silverbrook et al. | 382/203 |
| 2006/0244748 | A1 * | 11/2006 | Long et al. | 345/422 |
| 2007/0047817 | A1 * | 3/2007 | Abdulkader | 382/182 |
| 2007/0071339 | A1 * | 3/2007 | Yang et al. | 382/240 |
| 2007/0176929 | A1 * | 8/2007 | Grabli et al. | 345/427 |
| 2008/0008387 | A1 * | 1/2008 | Cheng et al. | 382/186 |
| 2009/0102857 | A1 * | 4/2009 | Kallio | 345/611 |
| 2009/0201288 | A1 * | 8/2009 | Fischer et al. | 345/419 |
| 2009/0225081 | A1 * | 9/2009 | Keller et al. | 345/426 |
| 2009/0226080 | A1 * | 9/2009 | Boyd et al. | 382/154 |
| 2010/0022879 | A1 * | 1/2010 | Migita | 600/443 |
| 2010/0085357 | A1 * | 4/2010 | Sullivan et al. | 345/420 |
| 2010/0164956 | A1 * | 7/2010 | Hyndman et al. | 345/427 |
| 2010/0194768 | A1 | 8/2010 | Schrag | |
| 2010/0204971 | A1 * | 8/2010 | Yin et al. | 703/6 |
| 2011/0075257 | A1 * | 3/2011 | Hua et al. | 359/464 |
| 2011/0157155 | A1 * | 6/2011 | Turner et al. | 345/419 |
| 2011/0175916 | A1 * | 7/2011 | Noris et al. | 345/441 |
| 2011/0181606 | A1 * | 7/2011 | Sumner et al. | 345/474 |
| 2011/0261427 | A1 * | 10/2011 | Hart et al. | 359/22 |
| 2011/0285910 | A1 * | 11/2011 | Bamji et al. | 348/631 |
| 2012/0081357 | A1 * | 4/2012 | Habbecke et al. | 345/419 |
| 2012/0229463 | A1 * | 9/2012 | Yeh et al. | 345/422 |
| 2014/0078143 | A1 * | 3/2014 | Lee et al. | 345/426 |

OTHER PUBLICATIONS

Non-final Office Action dated May 23, 2014 for U.S. Appl. No. 13/353,249, 20 pages.

Notice of Allowance for U.S. Appl. No. 13/353,249, dated Oct. 1, 2014, 16 pages.

Baerentzen, J. A., et al., "Signed distance computation using the angle weighted pseudonormal," IEEE Transactions on Visualization and Computer Graphics, May 2005, vol. 11 pp. 243-253.

Baxter, W., et al., "Project Gustav: Immersive digital painting," ACM SIGGRAPH 2010 Talks, 2010, ACM, 1 page.

Bernhardt, A., et al., "Matisse: Painting 2D regions for modeling free-form shapes," Eurographics Workshop on Sketch-Based Interfaces and Modeling, 2008, pp. 57-64.

Booker, P., "A history of engineering drawing," Chatto & Windus, 1963.

Bourguignon, D., et al., "Drawing for illustration and annotation in 3d," Computer Graphics Forum 2001, vol. 20, No. 3, pp. 114-122.

Bousseau, A., et al., "Interactive watercolor rendering with temporal coherence and abstraction," Proceedings of the 4th international symposium on Non-photorealistic animation and rendering, 2006, pp. 141-149.

Bruckner, S., et al., "Hybrid visibility compositing and masking for illustrative rendering," Computers and Graphics, 2010, vol. 34, No. 4, pp. 361-369.

Cohen, J. M., et al., "Harold: A world made of drawings," Proceedings of the 1st International Symposium on Non-Photorealistic Animation and Rendering, 2000, pp. 83-90.

Durand, F., "An invitation to discuss computer depiction," Proceedings of the 2nd international symposium on Non-photorealistic animation and rendering, 2002, pp. 111-124.

Frisken, S. F., et al., "Adaptively sampled distance fields: A general representation of shape for computer graphics," Proceedings of ACM SIGGRAPH 2000, Computer Graphics Proceedings, Annual Conference Series, 2000, pp. 249-254.

Gottschalk, S., et al., "Obbtree: A hierarchical structure for rapid interference detection," Proceedings of SIGGRAPH 96, Computer Graphics Proceedings, Annual Conference Series, 1996, pp. 171-180.

Haeberli, P.E., "Paint by numbers: Abstract image representations," Computer Graphics (Proceedings of SIGGRAPH 90), 1990, pp. 207-214.

Hart, J. C., "Sphere tracing: A geometric method for the antialiased ray tracing of implicit surfaces," The Visual Computer, 1994, vol. 12, pp. 527-545.

Hertzmann, A., "A survey of stroke-based rendering. Computer Graphics and Applications," IEEE, Jul.-Aug. 2003, vol. 23, No. 4, pp. 70-81.

Hertzmann, A., "Painterly Rendering with Curved Brush Strokes of Multiple Sizes," Proceedings of SIGGRAPH 98, Computer Graphics Proceedings, Annual Conference Series, 1998, pp. 453-460.

Igarashi, T., et al., "Teddy: A sketching interface for 3d freeform design," Proceedings of SIGGRAPH 99, Computer Graphics Proceedings, Annual Conference Series, 1999, pp. 409-416.

Judd, T., et al., "Apparent ridges for line drawing," ACM Transactions on Graphics, Jul. 2007, vol. 26, No. 3, 7 pages.

Kalnins, R. D., et al., "WYSIWYG npr: Drawing strokes directly on 3d models," ACM Transactions on Graphics, Jul. 2002, vol. 21, No. 3, pp. 755-762.

Karpenko, O., et al., "Free-form sketching with variational implicit surfaces," Computer Graphics Forum, 2002, vol. 21, No. 3, pp. 585-594.

Keefe, D. F., et al., "Cavepainting: a fully immersive 3d artistic medium and interactive experience," Proceedings of the 2001 symposium on Interactive 3D graphics, 2001, ACM, pp. 85-93.

Keefe, D., et al., "Drawing on air: Input techniques for controlled 3d line illustration," IEEE Transactions on Visualization and Computer Graphics, 2007, vol. 13, pp. 1067-1081.

Kowalski, M. A., et al., "Art-based rendering of fur, grass, and trees," Proceedings of SIGGRAPH '99, Computer Graphics Proceedings, Annual Conference Series, 1999, pp. 433-438.

Litwinowicz, P., "Processing Images and Video for an Impressionist Effect," Proceedings of SIGGRAPH 97, Computer Graphics Proceedings, Annual Conference Series, 1997, pp. 407-414.

Lu, J., et al., "Interactive painterly stylization of images, videos and 3d animations," Proceedings of the 2010 ACM SIGGRAPH symposium on Interactive 3D Graphics and Games, 2010, pp. 127-134.

Luft, T., et al., "Real-time watercolor illustrations of plants using a blurred depth test," NPAR 2006: Fourth International Symposium on Non Photorealistic Animation and Rendering, 2006, pp. 11-20.

Mammen, A., "Transparency and Antialiasing Algorithms Implemented with the Virtual Pixel Maps Technique," IEEE Computer Graphics & Applications, 1989, vol. 9, No. 4, pp. 43-55.

Markosian, L., et al., Real-time nonphotorealistic rendering. In Proceedings of SIGGRAPH 97, Computer Graphics Proceedings, Annual Conference Series, 1997, pp. 415-420.

Markosian, L., et al., "Art-based rendering with continuous levels of detail," Proceedings of the 1st international symposium on Non-photorealistic animation and rendering, 2000, pp. 59-66.

"Maya, 3D Animation Software," by Autodesk (referenced at http://www.autodesk.com/maya), product overview retrieved from internet, 2 pages.

(56) References Cited

OTHER PUBLICATIONS

McCann, J., et al., "Local Layering," ACM Transactions on Graphics, 2009, vol. 28, No. 3, 7 pages.

Meier, B. J., Painterly rendering for animation. In Proceedings of SIGGRAPH '96, Computer Graphics Proceedings, Annual Conference Series, 1996, pp. 477-484.

Mudbox, 3D Digital Sculpting & Digital Painting Software, by Autodesk (referenced at http://www.autodesk.com/mudbox), product overview retrieved from internet, 2 pages.

Nealen, A., et al., "Fibermesh: Designing freeform surfaces with 3d curves," ACM Transactions on Graphics, Jul. 2007, vol. 26, No. 3, 9 pages.

"Paint Effects, Painting in 3D using paint effects," Autodesk Maya Learning Resources (referenced at http://autodesk.com/us/maya/2011help/index.html), product overview retrieved from internet, 1 page.

Peng, J., et al. "Interactive modeling of topologically complex geometric detail," ACM Transactions on Graphics, Aug. 2004, vol. 23, No. 3, pp. 635-643.

Porter, T., et al., "Compositing digital images," Computer Graphics (Proceedings of SIGGRAPH 84), 1984, pp. 253-259.

Praun, E., et al., "Real-time hatching," Proceedings of ACM SIGGRAPH 2001, Computer Graphics Proceedings, Annual Conference Series, 2001, pp. 579-584.

Rademacher, P., "View-dependent geometry," Proceedings of SIGGRAPH '99, Computer Graphics Proceedings, Annual Conference Series, 1999, pp. 439-446.

Rivers, A., et al., "2.5d cartoon models," ACM Transactions on Graphics, Jul. 2010, vol. 29, No. 4, 7 pages.

Schkolne, S., et al., "Surface drawing: creating organic 3d shapes with the hand and tangible tools," Proceedings of the SIGCHI conference on Human factors in computing systems, 2001, ACM, pp. 261-268.

Schmid, J., et al., "OverCoat: An Implicit Canvas for 3D Painting," ACM Transactions on Graphics, 2011.

Teece, D., "Animating with expressive 3d brush strokes (animation abstract)," Proceedings of the 1st international symposium on Non-photorealistic animation and rendering, 2000, ACM.

Tolba, O., et al., "A projective drawing system," Proceedings of the 2001 symposium on Interactive 3D graphics, ACM, 2001, pp. 25-34.

Wallace, B. A., "Merging and transformation of raster images for cartoon animation," Computer Graphics (Proceedings of SIGGRAPH 81), 1981, pp. 253-262.

Willats, J., "Art and representation: new principles in the analysis of pictures," 1997, Princeton University Press.

Wyvill, G., et al., "Data structure for soft objects," The Visual Computer, 1986, vol. 2, No. 4, pp. 227-234.

"Zbrush software tools" (referenced at http://www.pixologic.com/zbrush/), product overview retrieved from internet, 1 page.

* cited by examiner (a)  (b)  (c)

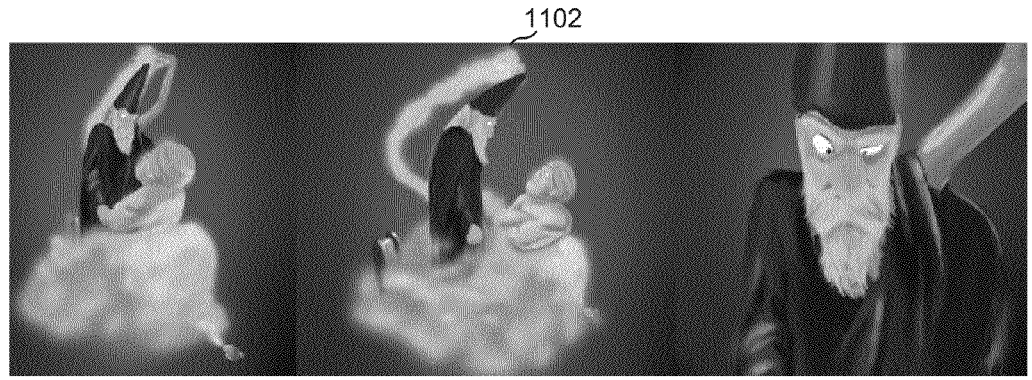
(a)        (b)        (c)
FIG. 11
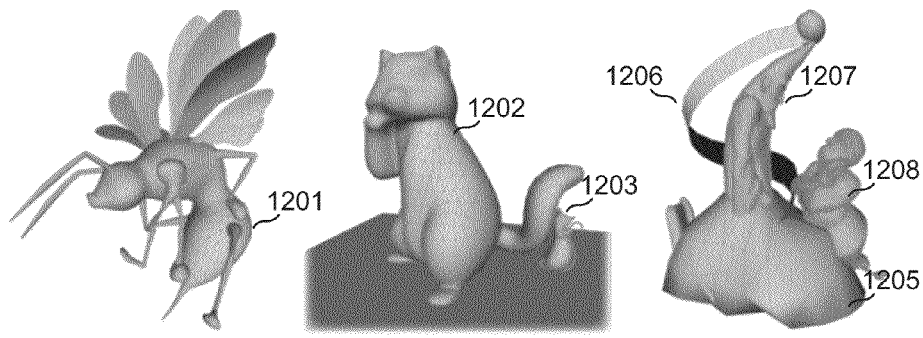
(a)        (b)        (c)
FIG. 12
| Example | Triangles | Strokes | Splats | Time |
|---|---|---|---|---|
| Autumn Tree | 29,000 | 21,000 | 138,000 | 270 ms |
| Captain Mattis | 6,600 | 5,000 | 40,000 | 70 ms |
| Cat and Mouse | 7,500 | 5,000 | 130,000 | 200 ms |
| Angry Bumble Bee | 6,300 | 20,000 | 304,000 | 370 ms |
| Wizard vs. Genie | 30,000 | 24,000 | 452,000 | 610 ms |
FIG. 13

| Scene | Strokes | Splats | Fragments | Maximum Fragments | Time |
|---|---|---|---|---|---|
| Portrait | 14 k | 253 k | 18 M | 748 | 6.7 s |
| Tree | 21 k | 166 k | 33 M | 1035 | 14 s |
| Cat | 6.5 k | 158 k | 61 M | 1352 | 26 s |
| Captain | 1.8 k | 23 k | 29 M | 628 | 12 s |
| Bee | 20 k | 347 k | 109 M | 3609 | 75 s |

FIG. 22

MIXED-ORDER COMPOSITING FOR IMAGES HAVING THREE-DIMENSIONAL PAINTING EFFECTS

CROSS-REFERENCES TO RELATED APPLICATIONS

This application is a Continuation-in-Part (CIP) of U.S. patent application Ser. No. 13/353,249, filed on Jan. 18, 2012, and claims priority from and is a non-provisional of U.S. Provisional Patent Application No. 61/487,684 filed May 18, 2011. The entire disclosures of these applications are incorporated herein by reference for all purposes.

FIELD OF THE INVENTION

The present invention relates generally to image generation and more specifically to image generation (whether individual images or animation sequences of images) based on elements that include simulated paint strokes represented in a three-dimensional space.

BACKGROUND

Traditional two-dimensional ("2D") painting techniques and digital 2D painting systems provide an artist with a lot of expressive freedom in the creation of a digital "painting," allowing a wide range of styles. Herein, "painting" or "a painting" refers to a process and/or an object or output that results from some input into a digital system such that the image is represented, or representable, by picture elements or objects that are electronically stored or storable. When an image is generated from the corresponding elements or objects, the elements or objects are considered in determining the colors of various pixels of the image. Of course, physically painting onto a physical surface or three-dimensional object and then taking a photograph of that work can be used to convey a painted scene, but there are many situations where it is desirable to allow artists and others to work with digital media and output a representation of what appears to be painting or some desired representation or approximation of painting. A collection of strokes embedded in space can be considered a "3D painting."

Translating the expressive freedom into three dimensions, so that paintings could be viewed from multiple angles or obtaining other benefits of a 3D representation, has been a research challenge for many years.

REFERENCES

[Baerentzen] Baerentzen, J. A., and Aanaes, H. 2005. Signed distance computation using the angle weighted pseudonormal. *IEEE Transactions on Visualization and Computer Graphics* 11 (May), 243-253.

[Baxter] Baxter, W., Chu, N., and Govindaraju, N. 2010. Project Gustav: Immersive digital painting. In *ACM SIGGRAPH 2010 Talks*, ACM, 41:1-41:1.

[Bernhardt] Bernhardt, A., Pihuit, A., Cani, M.-P., and Barthe, L. 2008. Matisse: Painting 2D regions for modeling free-form shapes. In Eurographics Workshop on Sketch-Based Interfaces and Modeling, 57-64.

[Booker] Booker, P. 1963. *A history of engineering drawing*. Chatto & Windus.

[Bourguignon] Bourguignon, D., Cani, M.-P., and Drettakis, G. 2001. Drawing for illustration and annotation in 3d. *Computer Graphics Forum* 20, 3, 114-122.

[Bousseau] Bousseau, A., Kaplan, M., Thollot, J., and Sillion, F. X. 2006. Interactive watercolor rendering with temporal coherence and abstraction. In *Proceedings of the 4th international symposium on Non-photorealistic animation and rendering*, 141-149.

[Bruckner] Bruckner, S., Rautek, P., Viola, I., Roberts, M., Sousa, M. C., and Grller, M. E. 2010. Hybrid visibility compositing and masking for illustrative rendering. Computers and Graphics 34, 4, 361-369.

[Cohen] Cohen, J. M., Hughes, J. F., and Zeleznik, R. C. 2000. Harold: A world made of drawings. In *Proceedings of the 1st International Symposium on Non-Photorealistic Animation and Rendering*, 83-90.

[Daniels] Daniels, Eric and Lappas, Anastasios and Katanics, George T. Method and apparatus for three-dimensional painting. 2001. U.S. Pat. No. 6,268,865.

[Durand] Durand, F. 2002. An invitation to discuss computer depiction. In *Proceedings of the 2nd international symposium on Non-photorealistic animation and rendering*, 111-124.

[Frisken] Frisken, S. F., Perry, R. N., Rockwood, A. P., and Jones, T. R. 2000. Adaptively sampled distance fields: A general representation of shape for computer graphics. In *Proceedings of ACM SIGGRAPH 2000, Computer Graphics Proceedings, Annual Conference Series*, 249-254.

[Gottschalk] Gottschalk, S., Lin, M. C., and Manocha, D. 1996. Obbtree: A hierarchical structure for rapid interference detection. In *Proceedings of SIGGRAPH 96, Computer Graphics Proceedings, Annual Conference Series*, 171-180.

[Haeberli] Haeberli, P. E. 1990. Paint by numbers: Abstract image representations. In *Computer Graphics (Proceedings of SIGGRAPH 90)*, 207-214.

[Hart] Hart, J. C. 1994. Sphere tracing: A geometric method for the antialiased ray tracing of implicit surfaces. *The Visual Computer* 12, 527-545.

[Hertzmann] Aaron Hertzmann. Painterly Rendering with Curved Brush Strokes of Multiple Sizes. *Proceedings of SIGGRAPH 98* in Computer Graphics Proceedings, Annual Conference Series, pages 453-460, 1998.

[Hertzmann] Hertzmann, A. 2003. A survey of stroke-based rendering. *Computer Graphics and Applications, IEEE* 23, 4 (July-August) 70-81.

[Igarashi] Igarashi, T., Matsuoka, S., and Tanaka, H. 1999. Teddy: A sketching interface for 3D freeform design. In *Proceedings of SIGGRAPH 99, Computer Graphics Proceedings, Annual Conference Series*, 409-416.

[Judd] Judd, Durand, F., and Adelson, E. 2007. Apparent ridges for line drawing. *ACM Transactions on Graphics* 26, 3 (July), 19:1-19:7.

[Kalnins] Kalnins, R. D., Markosian, L., Meier, B. J., Kowalski, M. A., Lee, J. C., Davidson, P. L., Webb, M., Hughes, J. F., and Finkelstein, A. 2002. WYSIWYG NPR: Drawing strokes directly on 3D models. *ACM Transactions on Graphics* 21, 3 (July), 755-762.

[Karpenko] Karpenko, O., Hughes, J. F., and Raskar, R. 2002. Free-form sketching with variational implicit surfaces. *Computer Graphics Forum* 21, 3, 585-594.

[Katanics] Katanics, G., and Lappas, T. 2003. Deep Canvas: Integrating 3D Painting and Painterly Rendering. In *Theory and Practice of Non-Photorealistic Graphics: Algorithms, Methods, and Production Systems*, ACM SIGGRAPH 2003 Course Notes.

[Keefe] Keefe, D. F., Feliz, D. A., Moscovich, T., Laidlaw, D. H., and Laviola, J R., J. J. 2001. Cavepainting: a fully immersive 3D artistic medium and interactive experience. In Proceedings of the 2001 symposium on Interactive 3D graphics, ACM, 85-93.

[Keefe] Keefe, D., Zeleznik, R., and Laidlaw, D. 2007. Drawing on air: Input techniques for controlled 3D line illustration. *IEEE Transactions on Visualization and Computer Graphics* 13, 1067-1081.

[Kowalski] Kowalski, M. A., Markosian, L., Northrup, J. D., Bourdev, L., Barzel, R., Holden, L. S., and Hughes, J. F. 1999. Art-based rendering of fur, grass, and trees. In *Proceedings of SIGGRAPH '99*, Computer Graphics Proceedings, Annual Conference Series, 433-438.

[Litwinowicz] Peter Litwinowicz. Processing Images and Video for an Impressionist Effect. *Proceedings of SIGGRAPH 97* in Computer Graphics Proceedings, Annual Conference Series, pages 407-414, 1997.

[Lu] Lu, J., Sander, P. V., and Finkelstein, A. 2010. Interactive painterly stylization of images, videos and 3D animations. In *Proceedings of the 2010 ACM SIGGRAPH symposium on Interactive 3D Graphics and Games*, 127-134.

[Luft] Luft, T., and Deussen, O. 2006. Real-time watercolor illustrations of plants using a blurred depth test. In *NPAR 2006: Fourth International Symposium on Non Photorealistic Animation and Rendering*, 11-20.

[Mammen] Abraham Mammen. Transparency and Antialiasing Algorithms Implemented with the Virtual Pixel Maps Technique. *IEEE Computer Graphics & Applications*, 9(4):43-55, 1989.

[Markosian 1997] Markosian, L., Kowalski, M. A., Trychin, S. J., Bourdev, L. D., Goldstein, D., and Hughes, J. F. 1997. Real-time nonphotorealistic rendering. In *Proceedings of SIGGRAPH 97*, Computer Graphics Proceedings, Annual Conference Series, 415-420.

[Markosian 2000] Markosian, L., Meier, B. J., Kowalski, M. A., Holden, L. S., Northrup, J. D., and Hughes, J. F. 2000. Art-based rendering with continuous levels of detail. In *Proceedings of the 1st international symposium on Non-photorealistic animation and rendering*, 59-66.

[Maya] Maya, 3D Animation Software, by Autodesk (referenced at http://www.autodesk.com/maya).

[McCann] James McCann and Nancy Pollard. Local Layering. *ACM Transactions on Graphics*, 28(3):84:1-84:7, 2009.

[Meier] Meier, B. J. 1996. Painterly rendering for animation. In *Proceedings of SIGGRAPH '96*, Computer Graphics Proceedings, Annual Conference Series, 477-484.

[Mudbox] Mudbox, 3D Digital Sculpting & Digital Painting Software, by Autodesk (referenced at http://www.autodesk.com/mudbox).

[Nealen] Nealen, A., Igarashi, T., Sorkine, O., and Alexa, M. 2007. Fibermesh: Designing freeform surfaces with 3D curves. *ACM Transactions on Graphics* 26, 3 (July), 41:1-41:9.

[Paint Effects] Paint Effects, Painting in 3D using paint effects. In *Autodesk Maya Learning Resources* (referenced at http://autodesk.com/us/maya/2011help/index.html).

[Peng] Peng, J., Kristjansson, D., and Zorin, D. 2004. Interactive modeling of topologically complex geometric detail. *ACM Transactions on Graphics* 23, 3 (August), 635-643.

[Porter] Porter, T., and Duff, T. 1984. Compositing digital images. In Computer Graphics (Proceedings of SIGGRAPH 84), 253-259.

[Praun] Praun, E., Hoppe, H., Webb, M., and Finkelstein, A. 2001. Real-time hatching. In *Proceedings of ACM SIGGRAPH 2001*, Computer Graphics Proceedings, Annual Conference Series, 579-584.

[Rademacher] Rademacher, P. 1999. View-dependent geometry. In *Proceedings of SIGGRAPH '99*, Computer Graphics Proceedings, Annual Conference Series, 439-446.

[Rivers] Rivers, A., Igarashi, T., and Durand, F. 2010. 2.5d cartoon models. *ACM Transactions on Graphics* 29, 4 (July), 59:1-59:7.

[Schkolne] Schkolne, S., Pruett, M., and Schröder, P. 2001. Surface drawing: creating organic 3D shapes with the hand and tangible tools. In *Proceedings of the SIGCHI conference on Human factors in computing systems*, ACM, 261-268.

[Schmid] Johannes Schmid and Martin Sebastian Senn and Markus Gross and Robert Sumner. OverCoat: An Implicit Canvas for 3D Painting. *ACM Transactions on Graphics*, 2011. to appear.

[Teece] Teece, D. 2000. Animating with expressive 3D brush strokes (animation abstract). In *Proceedings of the 1st international symposium on Non-photorealistic animation and rendering*, ACM.

[Tolba] Tolba, O., Dorsey, J., and McMillan, L. 2001. A projective drawing system. In *Proceedings of the 2001 symposium on Interactive 3D graphics*, ACM, 25-34.

[Wallace] Wallace, B. A. 1981. Merging and transformation of raster images for cartoon animation. In *Computer Graphics (Proceedings of SIGGRAPH 81)*, 253-262.

[Willats] Willats, J. 1997. *Art and representation: new principles in the analysis of pictures*. Princeton University Press.

[Wyvill] Wyvill, G., Mcpheeters, C., and Wyvill, B. 1986. Data structure for soft objects. *The Visual Computer* 2, 4, 227-234.

[Zbrush] Zbrush software tools (referenced at http://www.pixologic.com/zbrush/).

BRIEF SUMMARY

In embodiments of drawing and painting systems, artists and other users input strokes and other image elements using an input device, wherein the input device specifies a 2D view of the element. The system provides the 3D position of the element based on rules and processes, some of which allow for user input of high level parameters, thereby allowing for intuitive and quick entry of 3D elements. The 3D position of an element might have more information than is provided by the 2D view, where that additional information is provided by a set of operations, rules, processes and/or data. While an image in 2D might be acceptable from a single camera viewpoint and a single point in animation time, the additional information for 3D can be used so that the strokes provide a consistent view even as the camera viewpoint changes and/or as objects of a scene move as part of animation.

BRIEF DESCRIPTION OF THE DRAWINGS

FIG. 11 illustrates other aspects of an embedding process.

FIG. 12 illustrates proxy geometries used for various embedding operations illustrated by other figures.

FIG. 13 is a table of test results.

FIG. 22 is a table of experimental results.

DETAILED DESCRIPTION

Figure 1:
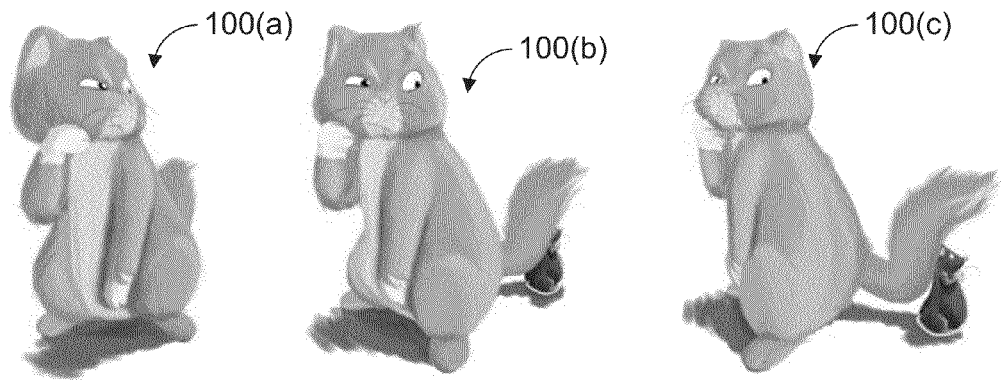
FIG. 1 illustrates an example of a drawing done with paint stroke tools and three different view angles on the drawing.

Improved computer-generated image generation is described herein. Below, the description begins with an overview, followed by examples of methods and apparatus that might be used to position strokes, such as simulated paint strokes, into a virtual three-dimensional (3D) space from two-dimensional (2D) inputs, then followed by descriptions of how such sets of simulated paint strokes might be rendered to provide suitable renderings that respond well to camera viewpoint movements and animations.

The improved computer-generated image generation systems described herein can be used to create single images or animated sequences of images. In particular, the images are generated from three-dimensional (3D) geometric models. As used herein, a geometric model is a computer-based, electronically readable representation of objects that have positions in a virtual 3D space. The objects can be representations of some physical object or of objects with no physical world counterpart. The objects can be things, light sources, atmospheric effects, and other things that affect a view. Typically, the view is from a camera viewpoint through a view plane, but other variations are possible, such as a view from two points for 3D imagery or a nonplanar view surface. A "scene" can be a view from a particular camera viewpoint through a particular view region, such as a view rectangle, of objects positioned in the virtual space, as well as lighting and effects. An image of the scene can be rendered by a computer-generated image generation system. For animation, a timed sequence of frames can be generated, with each frame being an image of the scene. This disclosure is not intended to be limited to any particular process of rendering or image generation from the geometric model.

Prior to the advent of computers, an artist wishing to paint a particular view would apply paint or some other substance onto a canvas, as an ordered set of strokes and the resulting image would be the sum effect of all of those strokes. Of course, some strokes might have no effect on the final view if they were totally covered by later strokes, but generally some set of strokes in effect defines a view. The typical painter's canvas is a 2D object, such as stretched cloth. Strokes have shapes and positions in the 2D canvas space, in addition to a stroke order, brush characteristics, paint characteristics, etc.

Working directly with brushes and paint to fill the canvas gives the artist full creative freedom of expression, evidenced by the huge variety of styles that have been explored through art's rich history. Modern digital painting software using computer processing can emulate the traditional painting metaphor while further empowering the artist with control over layering, compositing, filtering, and other digital effects. As a result, digital artists have an extremely powerful, flexible, and expressive toolset for creating 2D digital paintings.

When the painter is painting a single view, from a single direction, 2D painting might be enough. However, sometimes, painters using computers will want to paint in three dimensions. Thus, instead of merely specifying (by physical act of putting brush to canvas or by physical act of providing a computer input) a location, orientation, etc. of a brush stroke in two dimensions, an artist might want to perform "3D painting" wherein at least some of the strokes have a third dimension specified.

One approach for 3D digital painting is to use texture painting or other methods that project stroke centerlines onto another object's surface. The mathematical nature of such a process can betray the underlying 3D structure of the scene, leading to a "gift-wrapped" appearance. Typically, structures such as fur, hair, or smoke were addressed using special-purpose modeling software without the direct control afforded by painting. These limitations ultimately restrict the variety of styles possible with 3D digital painting and may hinder the artist's ability to realize their creative vision.

Using techniques and system described herein, the 2D painting metaphor can be generalized to 3D, allowing an artist to treat the full 3D space as a canvas. Strokes painted in the 2D viewport window are "embedded" in 3D space in a way that gives creative freedom to the artist while maintaining an acceptable level of controllability. As explained in more detail below, a drawing system can process the embedding of strokes according to a "canvas" defined implicitly by a 3D scalar field.

When the artist paints a stroke in 2D and it is embedded into 3D, that might result in different parts of the stroke being different distances from a camera point. Where parts of the stroke are further from the camera than other parts of the stroke, a renderer might attempt to keep splats (or components) of the stroke looking the same size in the rendered image even though some of them are further away from the camera and would have otherwise been smaller.

The term "3D scalar field" refers to a set of values for points in the virtual 3D space. A simple 3D scalar field might be the temperature at each point in a three-dimensional room or a 3D scalar field that is valued at each point according to the distance from that point to an origin point. In computer graphics, the room is a virtual room, a 3D space into which objects, lights, effects, etc. are placed. So, the 3D scalar field provides a scalar value at each point in the virtual 3D space where imagery is being placed. There are many ways to create a 3D scalar field and many are well-known. For example, the artist might pull one out of a database, or create one based on the outlines of objects in a scene. The 3D scalar field might be a property of the space/room into which the artist is placing objects and strokes.

In a specific embodiment, an artist uses an input device for 2D painting that allows the artist to treat the full 3D space as a canvas. Strokes painted in a 2D viewport window are embedded in 3D space in a way that gives creative freedom to the artist while maintaining an acceptable level of controllability. The canvas need not be tied to any particular object already in a scene, but the canvas can be dependent on, or a function of, another object.

In a specific embodiment, a canvas is defined by a 3D scalar field. The canvas might be thought of as an implicit canvas that a user or artist can shape by creating approximate 3D geometry or otherwise generating a 3D scalar field. An optimization procedure is then used to embed painted strokes in space by satisfying different objective criteria defined on the scalar field. This allows for painting along level set surfaces or across different level sets.

In defining an implicit canvas, the artist can "draw" the canvas, i.e., rather than adding color, tools create a local change in the scalar field that results in outward or inward protrusions along the field's gradient direction. The artist can shape the implicit canvas by creating approximate 3D proxy geometry, or starting with a blank field or other techniques described herein. An optimization procedure is then used to embed painted strokes in space by satisfying different objective criteria defined on the scalar field. The drawing system might include tools for painting along level set surfaces or in gradient directions. This fine-tuning of the implicit canvas might provide a unified painting/sculpting metaphor.

Rendering 3D paintings can be done by compositing strokes embedded in space. Image elements are rendered into an image representable by a pixel array wherein at least some of the image elements correspond to simulated paint strokes. At a pixel (or some other image division), fragments of one or more strokes might overlap. The contributions of some or all of those fragments might be composited to arrive at a color value (or other value) for that pixel or division.

In some embodiments, efficient rendering uses a graphics processing unit ("GPU") implementation of brush models for interactive rendering. The drawing and painting systems use computer processing to handle some of the input and output. The visibility ambiguity inherent in 3D stroke rendering can be handled with a depth offsetting method that may use hardware acceleration.

Stroke Order Processing

When an artist is painting a physical painting on a 2D canvas or is operating in a 2D painting metaphor, each new stroke covers up the strokes that the new stroke overlays, in whole or part. This is said to be compositing in "stoke order." This is not a problem, as a painter knows to paint strokes in a desired order as newer strokes might cover older strokes. Even in the case of virtual painting into a 3D virtual space with 2D inputs being embedded by being transformed into 3D brush strokes that are rendered in stroke order, there might not be a concern, if the image looks as desired by the artist.

However, an image generated from a set of 3D brush strokes (and possibly other objects) that looks acceptable from one camera viewpoint might not look acceptable as the camera viewpoint moves. Furthermore, as objects and elements of an image are moved as part of an animation process, there might be distracting or undesired pops, artifacts, etc. from frame to frame. Thus, compositing 3D brush strokes creates a challenge in reconciling conflicts between the z-order of the strokes in 3D with the order in which the strokes were painted, while maintaining temporal and spatial coherence. Various solutions are provided herein to provide for smooth transitions between compositing closer strokes over those farther away and compositing strokes painted later over those painted earlier. In some embodiments, a process can run in O(n log n) time, while being simple to implement.

Figure 16:
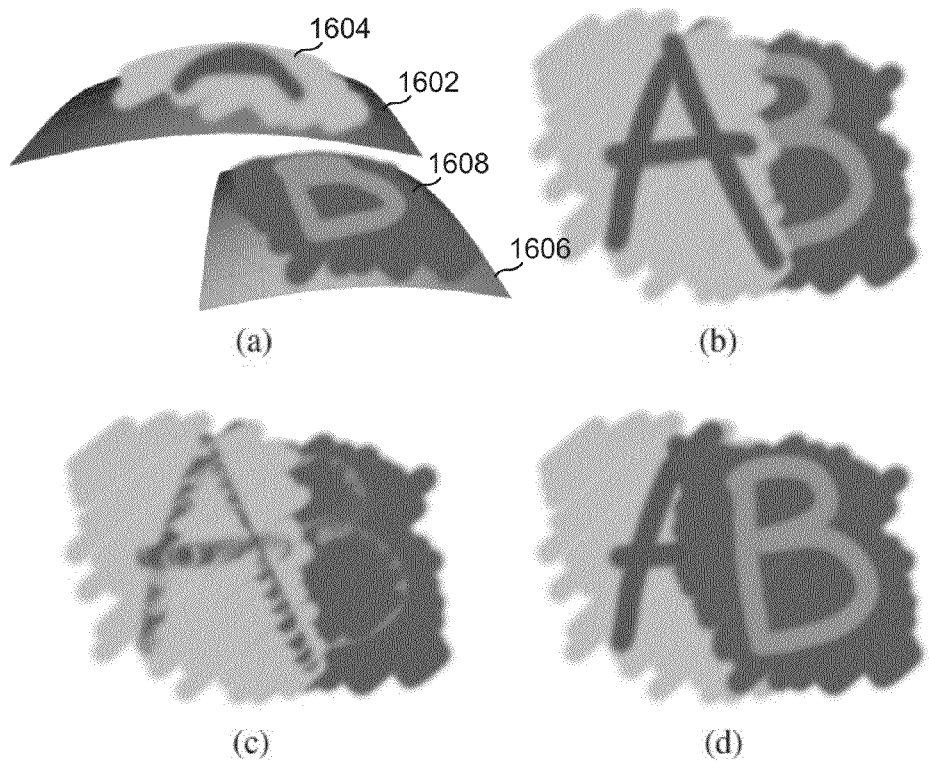
FIG. 16 illustrates results of various compositing orders.

From a 3D point of view, strokes that are closer to the viewer should obscure those that are farther away, which amounts to compositing in "depth order." Compositing purely in stroke order negates much of the benefit of 3D painting, as the sense of tangible objects can be lost when the view is changed. Compositing purely in depth order, on the other hand, leads to Z-fighting and precludes the artist from painting over existing strokes and thus ignores an important part of the 2D painting metaphor. An example of this problem is illustrated in FIG. 16, as explained in more detail below.

In the limited case of fragments painted onto surfaces, [Katanics] articulated the desire for mixed-order compositing: fragments that, in the artist's mind, belong on the same surface should be composited in stroke order, while those that belong on different surfaces should be composited in depth order. Unfortunately, assigning each fragment to a specific surface is often impossible if they did not already start out on specific surfaces, as could be the case when a 3D scalar field approach is used to place the strokes in 3D. The stroke that generated the fragment may span several surfaces, may self-occlude, or may not even conform to a surface at all. In the approached used by [Katanics], the Deep Canvas system adopts chooses ordering based on a depth tolerance d, such that fragments whose depths are within d of each other are assumed to lie on the same surface and composited in stroke order, but fragments that are farther apart are composited in depth order.

Previous approaches to ordering could potentially create one or more undesirable effects or characteristics. A desirable rendering approach typically meets, at least approximately, several properties for compositing order and temporal coherence:

(1) if two fragments have the same depth and are adjacent in stroke order, replacing them with their composite in stroke order should not change the final output for the pixel;

(2) if there is a depth separation of more than a specified distance (such as a user-specified distance) between adjacent fragments, then those fragments should be composited separately and then composited in depth order;

(3) if a fragment is fully transparent, it should have no effect; and (4) a compositing function should be continuous over color, transparency and depth.

To the extent these four properties are met, a desirable rendering and animation can be expected.

Painting Using a 3D Scalar Field Approach

FIG. 1 is a set of views of a 3D painting created using techniques described herein. Note that FIGS. 1(*a*), 1(*b*) and 1(*c*) are from different viewpoints in a virtual 3D space. However, since the brush strokes that make up the cat, mouse, shadows, etc. are specified in three dimensions, three separate 2D drawings were not needed to make up FIG. 1. One 3D drawing is sufficient, as the brush strokes are specified in three dimensions, so the different views of FIG. 1 only require a change of camera viewpoint. With painted strokes having 3D coordinates, each new view can be rendered by "repainting" (e.g., playing back) the recorded painting operations, using the camera's new view transformation. Since the painting strokes need only be constrained by a 3D scalar field and objective conditions, wide variations of artistic expression are possible.

Strokes are not required to be brush tool inputs, as other tools might be used instead. For example, some input devices might be used to input lines, ribbons, and/or other elements, which might be handled in the same way as strokes from a brush tool. For example, strokes can be brush strokes, pen strokes, pencil strokes, input lines, marks made by the user, image elements and other input elements.

In the examples herein, the person performing data entry of strokes might be referred to as an artist, a user, a painter, etc. depending on context. Unless otherwise specified, it should be understood that these are interchangeable labels. For example, if it is explained herein that user input is accepted by an artist editing system, it is not meant to exclude 3D painting by a person who would not consider themselves an artist. Thus, "artist" can refer to any user that provides input, such as a graphic artist, an animator, a director, a cinematographer, their assistants, etc.

One approach to 3D painting is to provide the painter with a 3D positioning and/or data entry system. For example, the painter might paint with a 3D mouse. A 3D mouse is a pointing device that provides position information such as a left-right position, an up-down position and a depth position, whereas a more common 2D mouse provides only a left-right position and an up-down position. However, 3D mice might make the painting process less intuitive and might not be common enough to be useful. It might also be that the hardware being used to generate images does not support 3D mice or other 3D input devices.

A better approach is to use strokes painted on a 2D surface such as from a 2D input device and embed them into the virtual 3D space. The "canvas" for such painting might be an editing display with input devices, a touch screen, or the like. Preferably, strokes painted in a 2D viewport window are embedded in 3D space in a way that gives creative freedom to the artist while maintaining an acceptable level of control.

Rendering can be done using the mixed-order compositing methods and apparatus described herein.

Hardware for Implementing an Image Generation System

Figure 2:
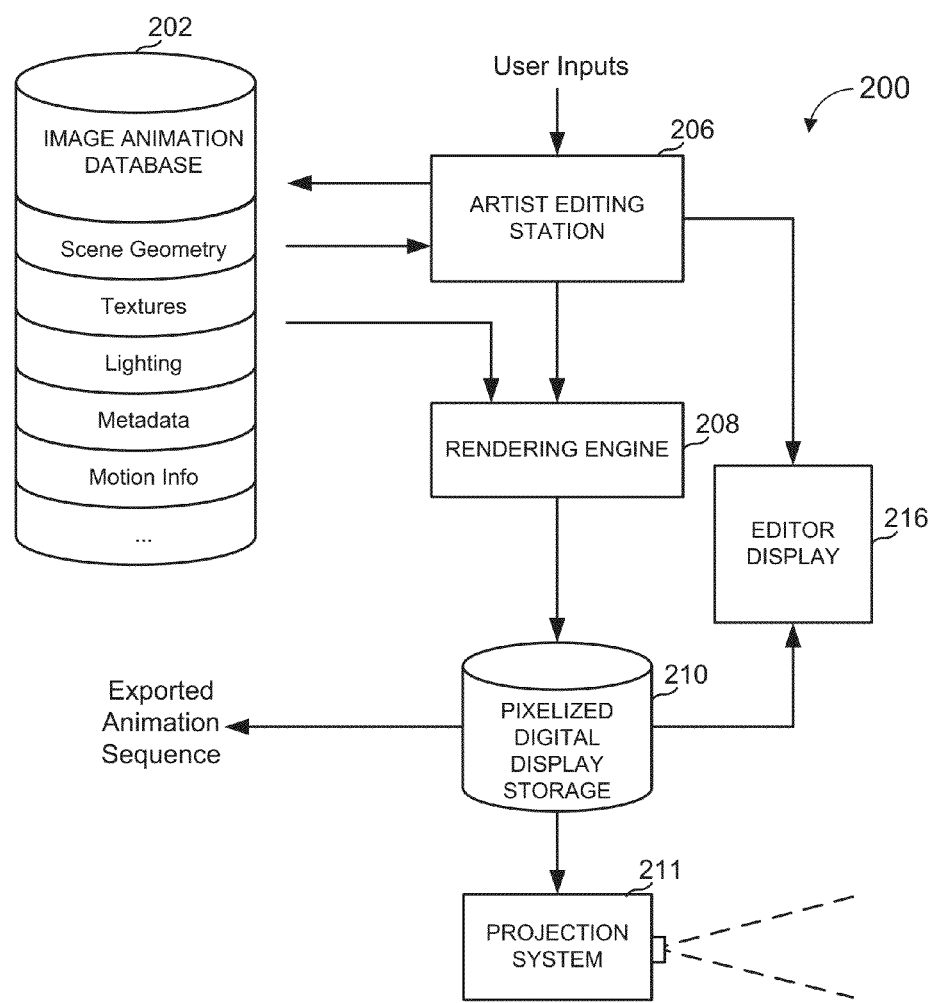
FIG. 2 illustrates elements of an editing and production system that supports stroke embedding tools.

FIG. 2 illustrates an image generation system 200 for creating, modifying, and presenting images and/or animation, comprising an image/animation database 202 that contains the particulars of a scene from which one or more images and/or animation is to be generated. Also shown is an artist editing station 206, a rendering engine 208, a pixelized digital display storage 210, a projection system 211, and an editor display 216. It should be understood that some of these elements can be implemented in software, hardware or a combination of hardware and software. The software could be separate modules or a larger system having several functions. Also, one or more of these elements could include (often not shown) memory, inputs, outputs, input devices and output devices for human, computer or electronic interfaces. It should be apparent from a reading of this description, that many of these elements can be implemented as a general purpose computer executing program code, while accepting inputs and issuing outputs and storing, reading and writing to memory allocated to that program code.

It should also be understood that not all of these elements are required. For example, it may be that the artist can fully create and specify an image without having to have seen a rendering result, in which case perhaps rendering is not needed until the final product is to be shown.

In the embodiment shown in FIG. 2, artist editing station 206 receives various inputs and generates parameters, 3D scalar fields, strokes, and other details used in an image. In one embodiment, image/animation database 202 includes a collection of object descriptions (the scene geometry, 3D objects, 2D strokes), textures, lighting, motion information, etc. For example, image/animation database 202 might include storage for a collection of objects that are parts of a character and storage for motion information describing how each of those objects moves from frame to frame. In an extremely simple case, the database might indicate that the scene geometry includes a textured, static background, a blue cube having an edge length of 4 units of length in the virtual space, and motion data to indicate that the cube does not rotate but translates 2 units up and 2 unit to the left for three frames, then stops and drops with a specified rotation for the next 20 frames, with fur that starts 3.5 units from the surface of the cube and extends away from the starting point a sufficient distance in three dimensions so that its end point coincides with the view ray through the end point the artist provided on a 2D input device and its mapping to the 2D viewport. Additionally, image/animation database 202 might include metadata not about the scenes to be generated, per se, but information about how the other data was generated and/or edited, for use in subsequent processing steps and/or editing steps.

The image/animation data might be implemented in any manner of data structure and/or storage, and need not be stored in a highly-structured database management system, so long as the image/animation data is electronically readable.

Artist editing station 206 might be an appropriately programmed general purpose computer, with input devices and display(s), such as an editor display 216 that an artist can use to obtain feedback as he/she enters paint strokes. Rendering engine 208 can read details from image/animation database 202 and produce pixelized digital display data that is stored in storage 210. Rendering engine 208 can run in real-time or not. The pixelized digital display can be in a raw form, such as a 2D pixel array with dimensions specified by a maximum resolution (e.g., 2920×2280, 2280×720), with each element of the array representing a pixel color value (often three or four "component" values). The pixelized digital display data might also be compressed, but the storage format need not be detailed here.

It may be the case that editor display 216 is of lower resolution and/or of lower quality than the underlying represented data. This might be useful in interactive editing, where it is not necessary to interactively generate to the final quality in order to allow the artist to work with the images. The pixelized digital display data is readable by projection system 211, which then can project the image or image sequences for viewing.

In many cases, an animation is created by one entity, such as a filmmaker, and the pixelized digital display data is distributed to a presenter in the form of digital transmission, storage on medium and transported to the presenter, such as a theater proprietor, DVDs transported and sold to end customers for small-scale viewing, medium provided to broadcasters, etc. As such, the generation of the animation might be done by one party independently of what a recipient of the medium and/or transmission does for the presentation. However, the animation process might be informed by actual or presumed details of how the presentation is to occur. As one example, the compensation might vary for varying projectors. As another example, the resolution and color depth might vary at the rendering engine 208 (and/or elsewhere) based on formats used by presenters (such as DVD formats, vs. standard broadcast format, vs. theatre presentation).

In operation, multiple artists and others might edit data in multiple rounds until the acceptable images are achieved. In some embodiments, an artist editing station 206 might allow for multiple stages of editing. It should also be understood that while operations of artist editing station 206 are described in terms of paint strokes, artist editing station 206 might also provide for other, non-stroke, user inputs, such as inputs used to generate objects that do not look like they are "painted" into the scene.

Figure 3:
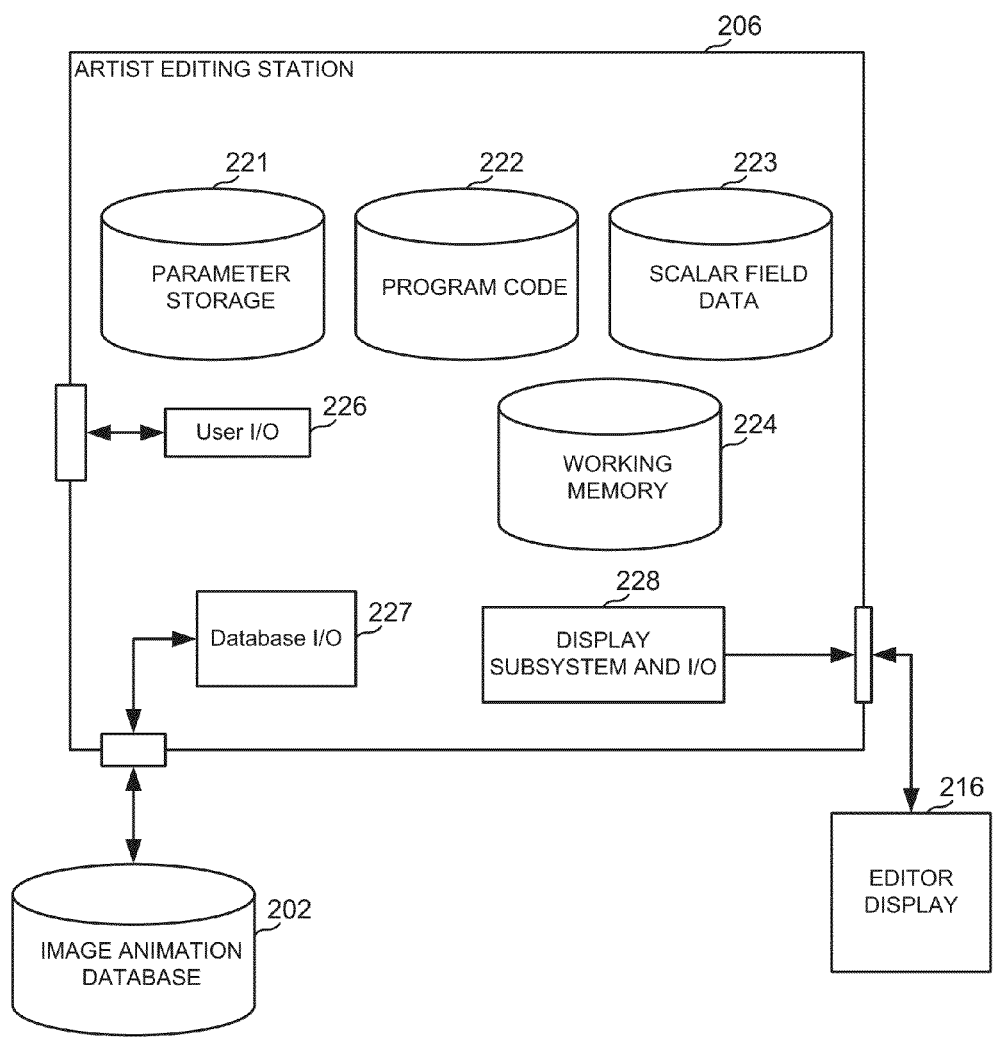
FIG. 3 illustrates elements of an editing station in greater detail.

FIG. 3 illustrates an example of hardware that might comprise artist editing station 206 of FIG. 2. In the described embodiment, artist editing station 206 is shown including interfaces to user I/O 226, editor display 216 (via display subsystem 228), and image/animation database 202 (via database I/O 227). Artist editing station 206 might be implemented on a computer that has a processor that can read/write from memory and process instructions, which memory might include, in one or more forms, parameter storage 221, program code storage 222, scalar field data storage 223, and working memory 224. User I/O devices might include a keyboard, a mouse, a tablet, etc. The interfaces and/or memory might also be used to provide the metadata about images, animation sequences and the like.

In various embodiments, editor display 216 may be embodied as a CRT display, an LCD display, a plasma display, a direct projection or rear projection DLP, a microdisplay, or the like. In various embodiments, editor display 216 may be used to visually display user interfaces, images, or the like as well as being part of an interactive environment that accepts artist inputs, shows results of animation generation and metadata, etc. and accepts further input.

In various embodiments, user input devices include a computer mouse, a trackball, a track pad, a joystick, wireless remote, touchscreen, drawing tablet, or the like. User input devices typically allow a user to select objects, icons, text and the like that appear on the editor display 216 via a command such as a click of a button or the like as well as indicating (i.e., "painting" or "embedding") the particulars of a paint stroke, etc.

Other interfaces (not shown) might exist as well, such as an Ethernet card, a modem (telephone, satellite, cable, ISDN), (asynchronous) digital subscriber line (DSL) unit, FireWire interface, USB interface, and the like. For example, computer interfaces may be coupled to a computer network, to a FireWire bus, or the like. In other embodiments, computer interfaces may be physically integrated on the motherboard of a computer and/or include software drivers, or the like.

The storage might be implemented as one or more of random access memory (RAM), disk drives, etc. RAM or other memory might hold computer instructions to be executed by one or more processors as a mechanism for effecting some functionality described herein that is implemented in software.

RAM and disk drives are examples of computer readable tangible media configured to store embodiments of the present invention including computer executable code implementing techniques described herein, data such as image files, object/scene models including geometric descriptions of objects, images, metadata about images and user inputs and suggestions, details and parameters of 3D scalar fields, procedural descriptions, a rendering engine, and/or the like. Other types of tangible media may include magnetic storage media such as floppy disks, networked hard disks, or removable hard disks, optical storage media such as CD ROMS, DVDs, holographic memories, and/or bar codes, semiconductor memories such as flash memories, read only memories (ROMS), battery backed volatile memories, networked storage devices, and the like.

In various embodiments, image generation system 200 may also include software that enables communications over a network such as the HTTP, TCP/IP, RTP/RTSP protocols, and the like. Other communications software and transfer protocols may also be used, for example IPX, UDP or the like.

In some embodiments, a graphical processor unit ("GPU") may be used to accelerate various operations.

FIG. 3 is representative of a computer system capable of embodying an image editing system. It will be readily apparent to one of ordinary skill in the art that many other hardware and software configurations are suitable for use. For example, the computer may be a desktop, portable, rack mounted or tablet configuration. Additionally, the computer may be a series of networked computers. Further, the use of other microprocessors are contemplated, such as Xeon™, Pentium™ or Itanium™ microprocessors from Intel; Turion™ 64 or Opteron™ microprocessors from Advanced Micro Devices, Inc; and the like. Further, other types of operating systems are contemplated, such as Vista™ or Windows XP™ or the like from Microsoft Corporation, Solaris™ from Sun Microsystems, Linux, Unix, or the like.

In still other embodiments, the techniques described above may be implemented upon a chip or an auxiliary processing board. Many types of configurations for computational devices can be used to implement various methods described herein. Further, processing components having different levels of computational power, e.g., microprocessors, graphics processors, RISC processors, embedded processors, or the like can also be used to implement various embodiments.

Stroke Placement, 3D Scalar Fields and 3D Scalar Field Editing

Using an image generation system such as image generation system 200, an artist might input strokes onto a 2D viewport, and the image generation system then embeds the strokes in the virtual 3D space by evaluating a 3D scalar field.

The 3D scalar field might be represented by a three-dimensional array of values, wherein each value defines a value of a scalar at some location in the field. That scalar is used to define implicit surfaces, proxy geometry in the 3D space, and more generally is used in the placement of strokes and/or the determination of the third dimension for all or parts of a stroke when the user input per stroke only provides specification of two dimensions for the stroke or parts of the stroke.

The 3D scalar field might be generated as a function of other objects in the virtual 3D space, or not. The 3D scalar field might be generated as function of a 3D proxy geometry that defines a scalar distance field. For example, the artist could specify that the 3D scalar field corresponds to distances along normals from a surface of a particular object. In an extremely simple case, the object is a sphere, and the 3D scalar field is a set of concentric spheres at various distances. Since 3D proxy geometries are allowed, the artist is not constrained to 3D geometries that are actually present in the virtual 3D space. In fact, the placement of strokes could be done using a 3D scalar field that does not correspond neatly (or at all) with well-defined surfaces.

The particular expression of a 3D scalar field might be thought of as an "implicit canvas" in that it need not relate to an object in a scene, but in the simplest cases, works out to be a canvas in 3D that strokes are—at least in part—painted onto or embedded into. In some cases, the 3D scalar field will define specific surfaces that are the implicit canvases, but in the general case, it might be that the 3D scalar field can be used to embed strokes in more complicated ways.

The 3D scalar field might define an implicit canvas based on a surface of a proxy geometry object, but this is not required. FIG. 12 illustrates some examples of such proxy geometries. An example of a proxy geometry is the object 1201 in FIG. 12(*a*). This is a proxy geometry of the angry bumble bee that also appears in FIGS. 9(*a*), 9(*b*), 10(*c*) and 10(*d*). Since object 1201 is proxy geometry, it does not need to exactly match the object it stands in for. Note, for example, that object 1201 has multiple wings for each side of the angry bumble bee, even though the actual angry bumble bee object does not have that many wings.

FIG. 12(*b*) illustrates other proxy geometry objects, such as a proxy cat 1202 and a proxy mouse 1203. Note that in FIG. 12(*c*) there is a proxy cloud 1205, a proxy ribbon 1206, a proxy wizard 1207, and a proxy genie 1208. While there is no requirement that a proxy geometry object not exactly match an actually present object, it is possible. For example, proxy wizard 1207 might well exactly match the geometry used to generate the wizard in FIG. 11(b). However, proxy geometries provide some flexibility. For example, proxy ribbon 1206 of FIG. 12(c) could be used as a surface for attaching smoke thereto, to create the smoke ribbon effect 1102 shown in FIG. 11(b), without requiring that a corresponding ribbon actually exist in the 3D geometry used to render a scene.

In addition to a 3D scalar field itself, an image generation system can also maintain some parameters that specify relationships between the paint strokes and the 3D scalar field. For example, the artist might specify a 3D proxy geometry and further specify that all strokes are to start and end a distance, d, from a surface of the 3D proxy geometry. As another example, the artist might specify that all strokes are to start where the 3D scalar field evaluates to a start value and are to end where the 3D scalar field evaluates to an end value. Image generation system 200 can then accept user input representing the paint stroke in two dimensions, i.e., where the paint stroke's projection on the 2D viewport starts and ends, and then image generation system 200 will generate the paint stroke's position in the virtual 3D space. This might or might not translate to an implicit canvas.

It should be noted that the person painting need not be the person specifying the 3D scalar field or the function that is used to place strokes in the virtual 3D space. In fact, the latter might be some computer process that determines the 3D scalar field or function.

An optimization procedure can be used to embed painted strokes into 3D space by satisfying criteria defined on the scalar field and implemented as different objective terms. Each objective term might be a quantity or expression that is evaluated by image generation system 200 as a measure of how well a particular objective has been met. Examples of some objectives and their corresponding objective terms are explained in more detail below.

In another example, the image generation system 200 has an objective term to ensure that strokes are embedded on a particular level set of the 3D scalar field. For example, suppose the 3D scalar field is the set of distances from an origin point. With that particular 3D scalar field, a level set would be the set of all points some constant distance from the origin point. Thus, the level set for the constant $L_s$ would be the sphere of radius $L_s$ centered on the origin point. Note that, since any level set value can be chosen, the artist is not restricted to painting on any particular surface. FIG. 5(a) illustrates an example of strokes that are embedded onto level sets.

Another objective term allows the artist to paint in the perpendicular direction of the scalar field, or more generally, across level sets, allowing fur, hairs, whiskers, or other effects to be created. An objective term might include artist-settable parameters. For example, the artist might specify that each stroke start on a level set of the 3D scalar field and be at a particular angle, alpha, to the level set. The artist might be provided a user interface element of the image generation system 200 that permits the artist to alter the value of alpha. FIG. 5(b) illustrates an example of an objective of having strokes begin at an angle perpendicular to a level set, whereas FIG. 5(c) illustrates an example of an objective of having strokes begin at an acute angle relative to a level set.

By formulating the optimization problem on the strokes themselves, the full scalar field need not be created and stored explicitly, leading to an efficient stroke embedding process and system. For example, instead of looking to evaluate the 3D scalar field at each point in the virtual 3D space (or even in the view frustum), the 3D scalar field might be evaluated from expressions only to the extent needed to place a stroke.

In addition to taking in input for strokes, image generation system 200 can also take in fine-scale control over an implicit canvas or proxy geometry. For example, image generation system 200 might also provide for a "sculpting" brush for creating a particular 3D scalar field and/or creating local changes in the scalar field, resulting in outward or inward protrusions along the field's gradient. Using this sculpting tool, artists can shape the geometry/canvas before painting into it, or move strokes that have already been embedded in the 3D scalar field to fine-tune the result.

Figure 4:
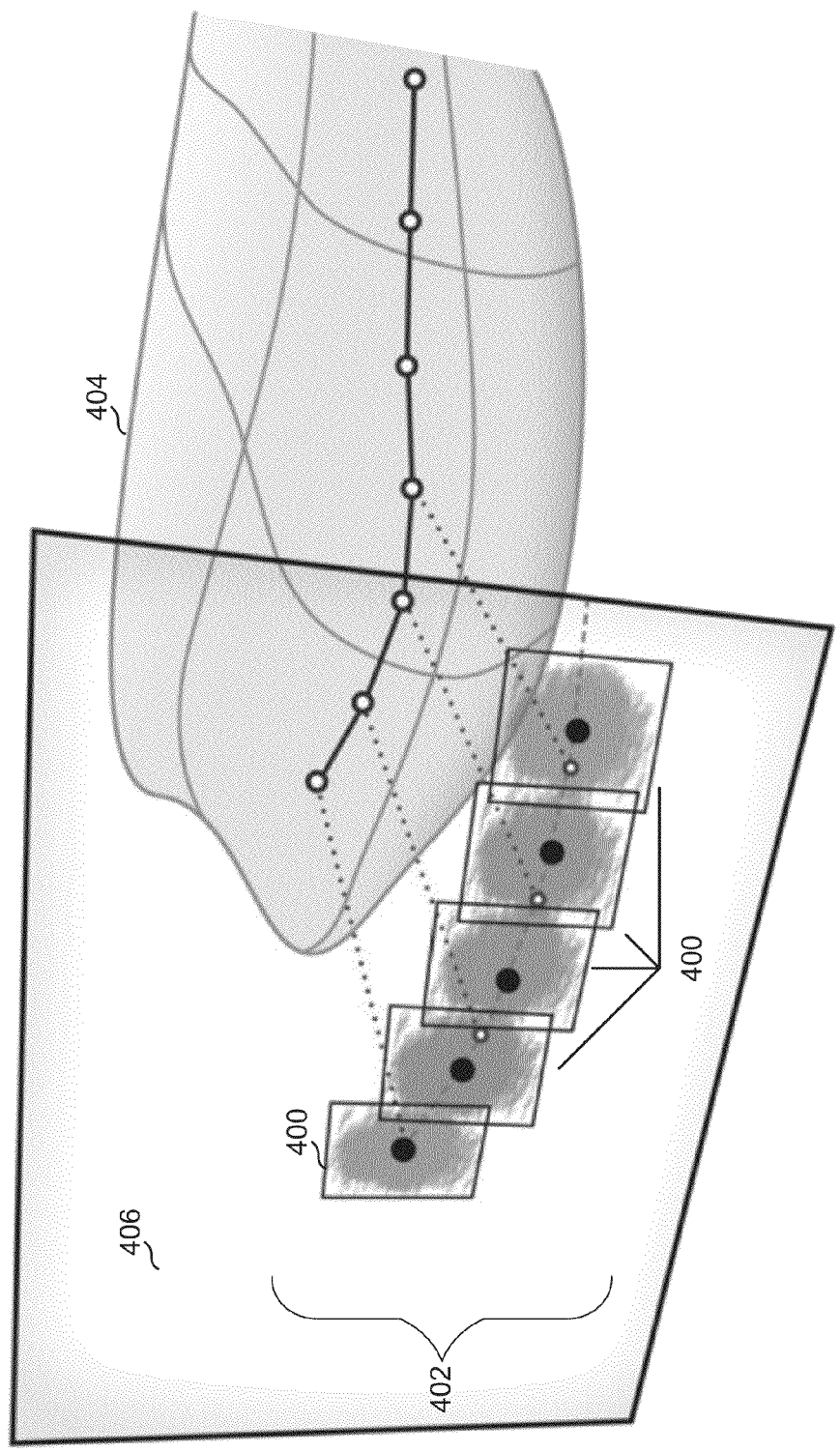
FIG. 4 illustrates an embedding operation.

For example, FIG. 4 illustrates a stroke 402 being embedded onto a 3D surface 404 after being drawn onto surface 406 using input devices of an image generation system. However, the image generation system might also accept inputs using those same input devices as part of a process of modifying 3D surface 404, as explained in more detail below.

In a simple case, an image generation system might accept user input as to the 2D position of a stroke, then determine a depth along a view ray for one, two, or more points along the stroke (specifically the centerline or some other points or lines of the stroke). The depth of a given 2D stroke point might be determined based on the 3D scalar field being used, the objective terms in use, and possibly other parameters. An example is shown in FIG. 4 and explained in more detail below.

Paint strokes may attempt to represent photorealistic aspects of a scene (i.e., attempt to convey scene elements that might appear to a viewer as being physically existing elements viewed from a real-world position) and/or represent non-photorealistic aspects of a scene, ranging from cartoonish to complex computer-generated imagery.

Canvas Representation

Internally, a drawing system might represent a 3D canvas as a scalar field f: $R^3 \rightarrow R$. As used herein, "R" may refer to the field of real numbers (often seen in "blackboard bold" font), so that $R^3$ might refer to the field of points in three dimensional space. A point, x, with f(x)=l is said to lie on level l. The corresponding implicit surface at level l, also called an isosurface or a level set, is the set of all points $x \in R^3$ such that f(x)=l.

Where a proxy object is present, the scalar field relates the points in space to the surface of the corresponding proxy object. A proxy object is defined by a triangle mesh that forms a closed manifold solid. The scalar field can be initially defined by signed Euclidean distances to the proxy geometry's surface.

By one convention, f(x) will be negative for points inside the proxy geometry, zero for points on the proxy geometry's surface, and positive for points outside the proxy geometry. The field normally encodes the signed Euclidean distance to the proxy geometry's surface. However, a sculpting tool can inflict direct, localized changes to the field values so that they no longer represent distances. In either case, in some embodiments, the scalar field is only $C^0$ continuous. This property typically has no negative influence on the stroke embedding with the objective terms and tools used. Where objective terms were introduced that are more sensitive to the scalar field smoothness, a scalar field formulation with higher order continuity, such as the one described by [Peng] might be used.

FIGS. 14(a)-(d) illustrate example representations of scalar fields with localized changes to the field values. In each of these figures, field values are represented by color shaded regions separated by isosurfaces (although, since the figures are 2D images, only cross-sections of the regions and isosurfaces are shown, by the colored regions and bounding circles, respectively). In FIGS. 14(a)-(d), positive values are in red, such as region 1402 far from the center of the concentric circles of FIG. 14(a), and negative values are in blue, such as region 1404 near the center of the concentric circles of FIG. 14(a).

Figure 14A:
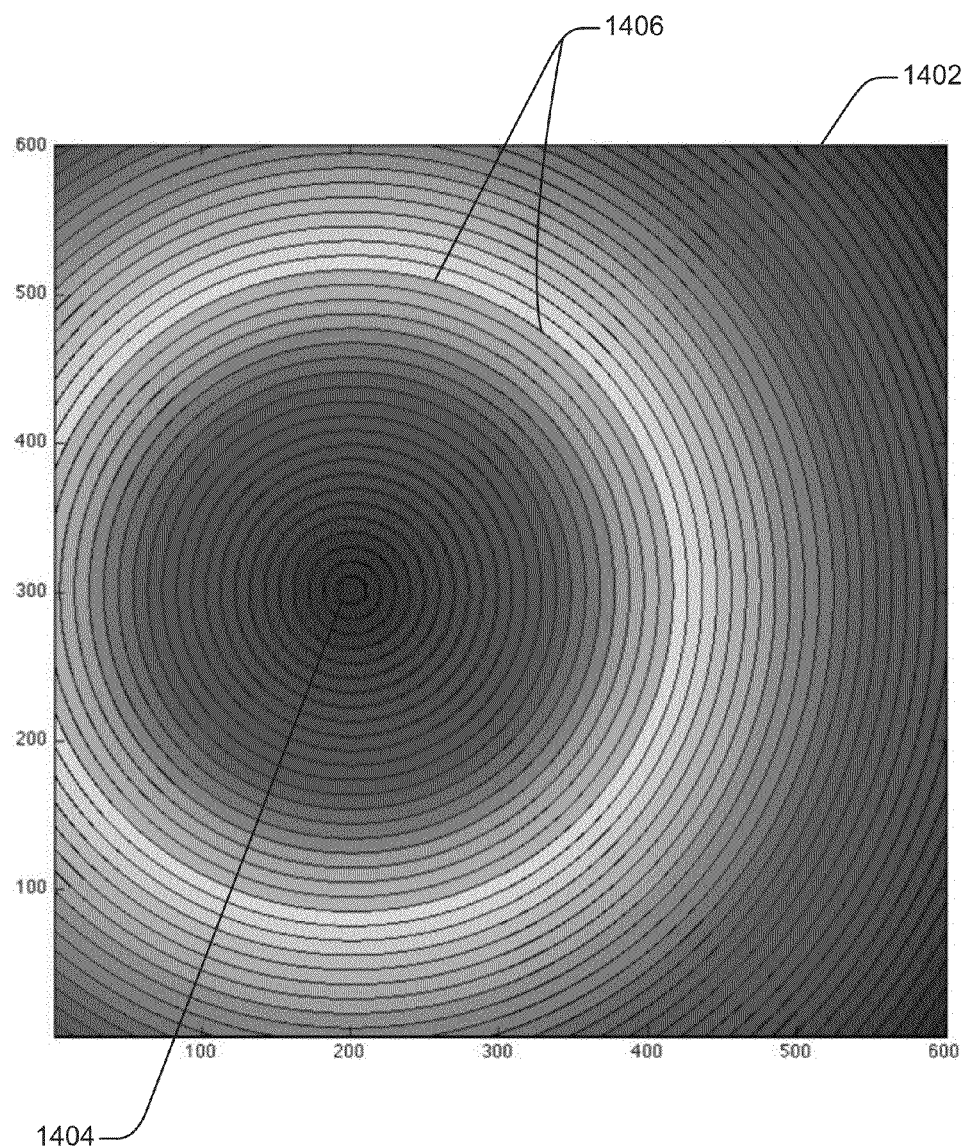
FIGS. 14(*a*)-(*d*) illustrate representations of views of various scalar fields.

FIG. 14(a) might be used to represent a scalar field that corresponds to distances from a surface 1406 (shown in the figure as a curve). In such a scalar field, the scalar field value at any given point in the 3D space is equal to that point's distance from a closest point on surface 1406, positive if it is outside the volume defined by the surface, negative if the point is inside the volume. In this example, assume that surface 1406 is a sphere, so that each isosurface is also a sphere. However, it should be apparent that many other surfaces are possible and the scalar field values can correspond to distance.

Figure 14B:
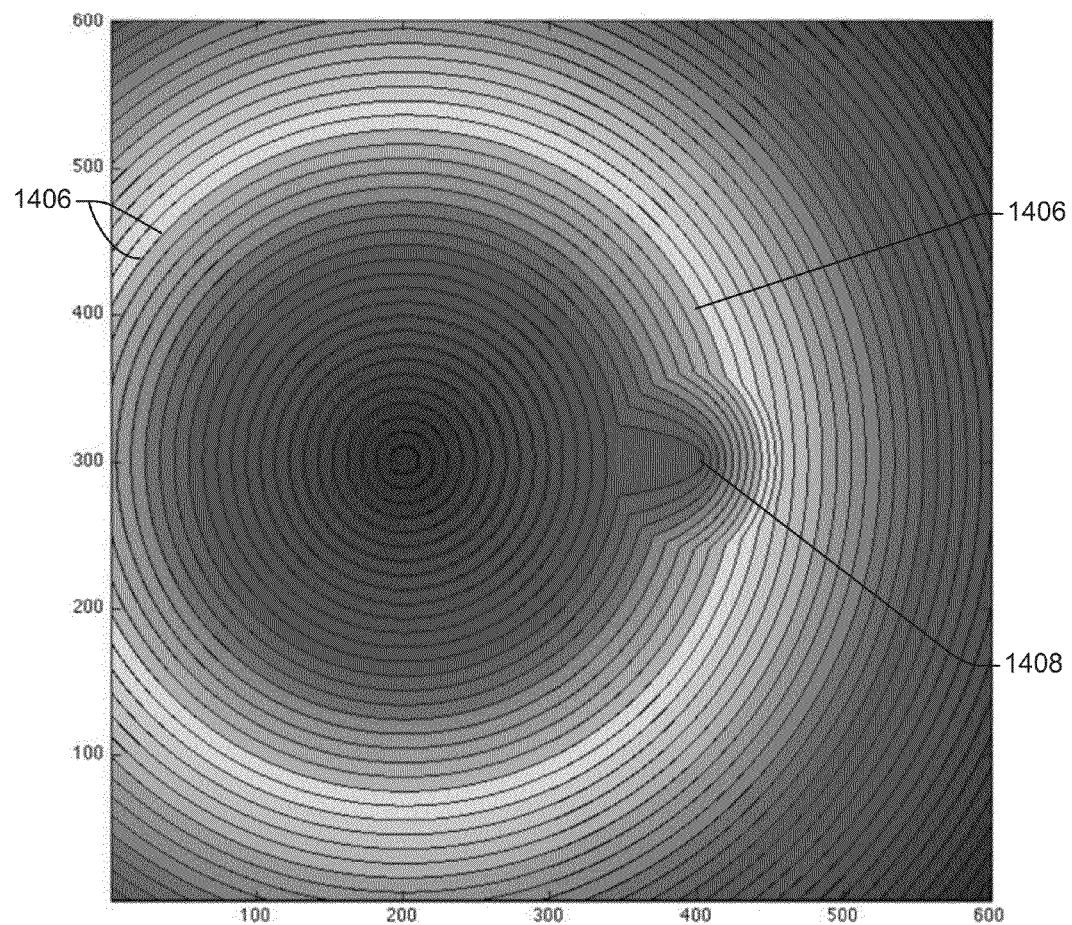
Figure 14C:
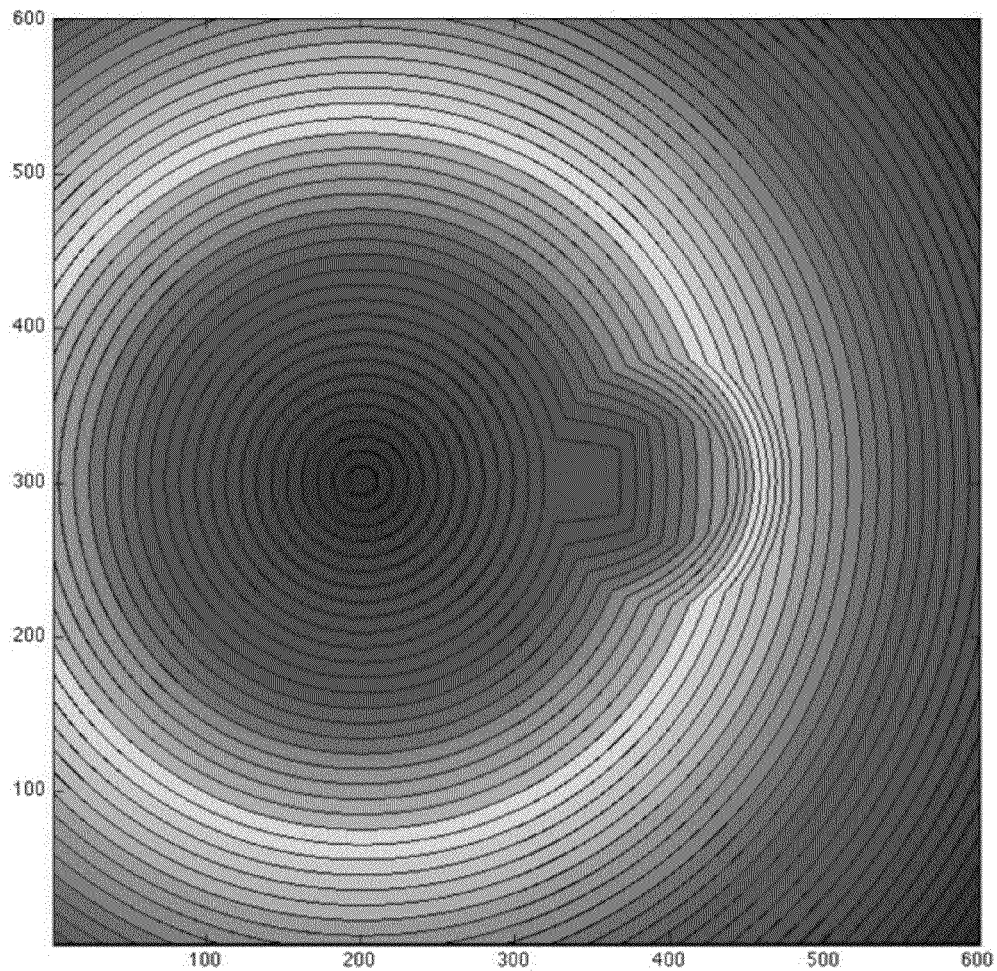
Figure 14D:
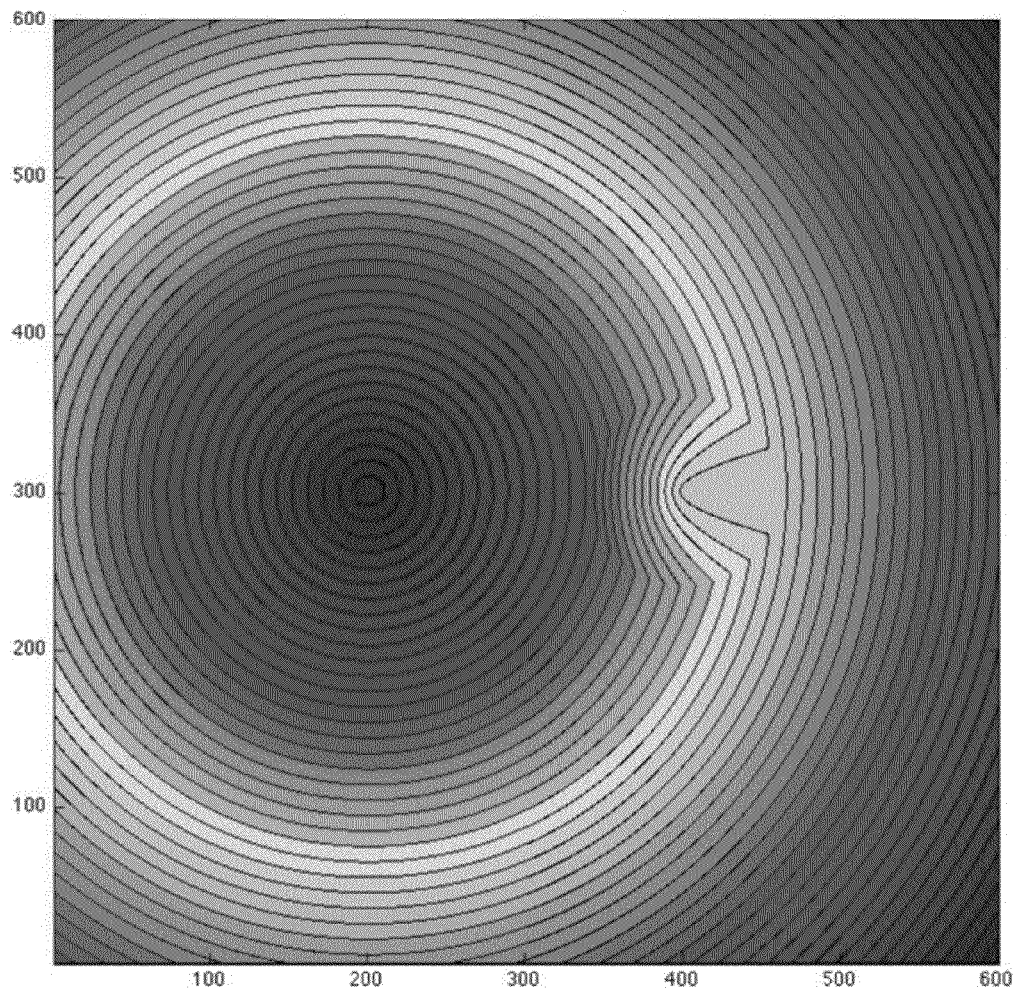
Figure 15:
FIG. 15 illustrates an example output of a 3D painting process.

FIGS. 14(b)-(d) illustrate different scalar fields, wherein localized modifications are done, as described in more detail below.

These operations on the scalar field can be done (see below) in a form that does not require explicit storage of the field values, to avoid the memory and computational costs of a voxel decomposition or the algorithmic complexity of more sophisticated distance-field representation methods.

Painting Representation

The drawing system provides a representation of a 3D painting with a data structure that stores essential and/or available input information associated with a painted stroke. This information can include the stroke's centerline (embedded in 3D space), the brush shape and color, and additional information such as pen pressure or velocity, if available. The centerline of a stroke can be stored as a sequence of points referred to herein as "stroke points." Position and variable parameters can be interpolated linearly between the stroke points, thus forming a polyline. With this information, the painting can be reproduced faithfully from the original view point by playing back all painting operations. This repainting procedure corresponds to rendering in examples herein. Due to the 3D nature of the canvas, the system can render the painting from any other vantage (view) point.

In selected embodiments, in order to match the feel of traditional 2D digital painting, paint strokes may be rendered in 2D on the view plane as flat brush strokes, much like traditional 2D raster painting software might draw them. An example of this is shown in FIG. 4, wherein a stroke 402 is represented by a set of splats on a view plane 406 and the splats are embedded using proxy geometry 404. Stroke centerlines are first projected from their embedded 3D locations onto the current view plane. The drawing system can then render the strokes by compositing a brush splat texture 400 along the stroke 402 into the image, as illustrated in FIG. 4. If the distance between splats 400 is small enough, the splats will appear as one smooth stroke. At paint time, the width of a stroke can be defined in screen space. When rendered from different view points, this width is perspectively transformed to maintain its size relative to the location in space at which it was embedded.

Since a perspective projection is used to transform the paint strokes from 3D to 2D (assuming the ultimate rendering is a 2D projection of the 3D scene), the screen size of painted objects will change as they undergo 3D transformations. The drawing system therefore can scale the size of the splats according to the difference in depth between its locations in camera space at paint time and at render time.

FIG. 4 illustrates how paint strokes might be stored in 3D in a parametric representation. For rendering, their centerlines are projected to the view plane and sampled with brush splats 400. The open circles in FIG. 4 represent stroke points, while closed circles are sampled splat locations.

Hardware and Software for Paint Stroke Input, Presentation and Manipulation

Operations of 3D painting software will now be described, which can be implemented using a general purpose computer (e.g., artist editing station 206 in FIGS. 2-3), but for readability, the example refers to a drawing system or a 3D drawing system. It should be understood that such a system includes some hardware and/or software stored on tangible media.

Such software would consider 2D user inputs, a 3D scalar field represented in memory, objective terms, and other parameters. The software can then manipulate paint strokes (and possibly other elements) and represent/place them in a 3D space. A stroke-based renderer might be used to generate temporally coherent expressive imagery, such as the cat's fur in FIG. 1, the scenes in FIGS. 9-10 and elsewhere in the figures. The imagery can be entirely independent of any objects in the space, their corresponding surfaces or other features.

A 3D scalar field might be defined with reference to particular objects in a scene, or only to 3D proxy geometry, or independent of any geometry. Commercial modeling packages, such as Maya, Mudbox, or ZBrush could be used to create some 3D proxy geometry. Proxy geometry refers to geometry that is not rendered in the final image.

An artist can sculpt proxy objects with a modeling package and import them into a scene as triangle meshes. FIG. 12 illustrates some triangle meshes. The proxy objects define the overall 3D layout of the scene but need not exhibit fine geometric details if they only serve as a guide for stroke embedding. They also need not be rendered in the final painting. Each proxy object implicitly defines a signed distance field that, conceptually, represents the object's 3D canvas. The software can provide the user with a set of tools to embed paint strokes into the 3D canvas. To paint, an artist might select a proxy object and then paint into the canvas using a familiar 2D painting interface. The painted strokes are embedded in 3D space by solving an optimization formulated in terms of the scalar field and perhaps also objective terms, as explained in more detail below.

The software used can provide the artist a choice of tools to activate different objective terms, giving the artist control over the embedding process. For example, the artist might be able to control whether adhering to a level distance is a strong or weak objective relative to other objectives. An additional sculpting tool might allow the user to make localized modifications to the scalar field using the same embedding procedure, i.e., rather than painting strokes, the user is modifying the 3D scalar field. In this way, the painting interface can be used for both coloring the canvas and for manipulating the shapes. In both cases, they are instances of the user specifying two dimensions for an input (whether a stroke or a modification of the scalar field) and having the system provide the third dimension, possibly based on some high-level parameter specifications of the user. This allows for a natural input, without the user having to explicitly specify the third dimension everywhere.

The following sections describe details of an example drawing system that can be part of a larger image generation system (that might do other image manipulation that is not considered "drawing" per se).

In some embodiments, for flexibility and extensibility, an editing station (such as artist editing station 206 in FIGS. 2-3) that operates these tools with users might represent the embedding process as a mathematical optimization process that assigns a depth value to each point of the input paint stroke. Objective terms and constraints are then used in varying combinations to obtain different embedding behaviors, such as the different behaviors illustrated in FIG. 5. These combinations can be encapsulated and presented to the user as a set of different embedding tools, such as a tool to paint at a certain distance to the object (e.g., FIG. 5(a)), or to paint strokes that are perpendicular to the proxy surface (e.g., FIG. 5(b)). The embedding tools can use the scalar field magnitude, sign, and/or gradient in their objective terms to establish criteria that relate any position in space to the proxy object.

One advantage of embedding paint strokes using an optimization instead of specialized heuristics (such as direct projection) is that it allows the system to gracefully handle situations where a tool's primary goal cannot be met. For example, by incorporating a regularizing smoothness term, a level set painting tool can easily handle the case where painted strokes extend beyond the level set's silhouette. A method based on direct projection would require special heuristics since, in this case, there is no surface on which to project.

An additional sculpting tool allows the user to make localized modifications to the scalar field using the same embedding procedure. In this way, the painting interface can be used both for coloring the canvas and for manipulating the shapes.

Stroke Embedding

Using the drawing system, the artist paints in a particular 2D view of the 3D canvas, generating an ordered sequence of n stroke points, $s_i \in R$. A goal of stroke embedding is to find 3D positions $p_i \in R^3$ of these points in a way that is meaningful and useful to the artist. To target an embedding algorithm that meets these workflow considerations in a flexible and extendable way, the drawing system can handle the embedding of the stroke points as an optimization problem. This framework allows for implementation of objective function terms that accomplish different embedding behaviors, such as painting on a level set of the 3D scalar field, or across the 3D scalar field's level set between two chosen level sets. Combinations of these terms are exposed to the user as different 3D embedding tools.

To ensure that the embedded strokes match the artist's intent, the stroke points $p_i$ should project back to their original screen space locations $s_i$ in the view from which they were painted. The drawing system can enforce this property strictly by parameterizing the stroke points by their view ray: $p_i = o + t_i d_i$, where o is the camera position, the view vector that passes through $s_i$ on the screen plane, and $t_i$ the ray parameter. The $t_i$ are thus the unknown variables of the optimization.

Objective Terms

In an example implementation, there are three objective terms to provide the ingredients for building the 3D drawing system's embedding tools, namely, a level distance term, an angle term, and an arc length term. These will be described in more detail. The level distance term is minimized when all stroke points are at a particular distance from the proxy geometry. The angle term minimizes the curvature of the stroke and thus smoothes its embedding. The arc length term favors straight embeddings by minimizing the total length of a stroke.

Level distance: The 3D drawing system allows the user to select a specific level l, and hence a specific isosurface, $f(x)=l$, on which to apply strokes. The corresponding level objective term should ensure that all stroke points are embedded as closely as possible to the selected isosurface. In the simplest case, the artist may want to paint directly on its surface, $l=0$. For added flexibility, each stroke point, $p_i$, can possess its own target level, $l_i$. The level distance objective term sums the difference between the actual field value $f(x)$ evaluated at all point locations $p_i$ and the desired level l. The level distance term is illustrated in Equation 1.

$$E_{level} = \sum_{i=1}^{n} (f(p_i) - l)^2 \qquad \text{(Eqn. 1)}$$

Angle: The angle objective term aims to minimize the directional deviation of consecutive line segments along a stroke. This deviation can be measured by the dot product between the normalized line segments, which equals one when the segments are co-linear. The angle objective term measurement is illustrated in Equation 2.

$$E_{angle} = \sum_{i=1}^{n-2} \left(1 - \frac{p_{i+2} - p_{i+1}}{\|p_{i+2} - p_{i+1}\|} \cdot \frac{p_{i+1} - p_i}{\|p_{i+1} - p_i\|}\right)^2 \qquad \text{(Eqn. 2)}$$

Arc Length: The arc length objective term penalizes the collective length of all segments. This term can be used to regularize the influence of the angle term when the level distance term is not needed. The arc length objective term is illustrated in Equation 3.

$$E_{length} = \sum_{i=1}^{n-1} \|p_{i+1} - p_i\|^2 \qquad \text{(Eqn. 3)}$$

A goal for an embedding tool is to find ray parameter values, $t_i$, and thus 3D locations for all stroke points, that minimize the weighted sum of all objective terms. The objective function of the optimization might be as illustrated in Equation 4.

$$E = w_{level} E_{level} + w_{angle} E_{angle} + w_{length} E_{length} \qquad \text{(Eqn. 4)}$$

Individual embedding tools, described in the next sections, achieve different behaviors by setting different values for the weights $w_{level}$, $w_{angle}$, and $w_{length}$. The drawing system might use the quasi-Newton L-BFGS method to solve this nonlinear optimization problem. Since the only unknowns to the optimization are the depth values, $t_i$, the optimization does not change the shape of a stroke in the view in which the stroke was painted.

Embedding Tools

Figure 5:
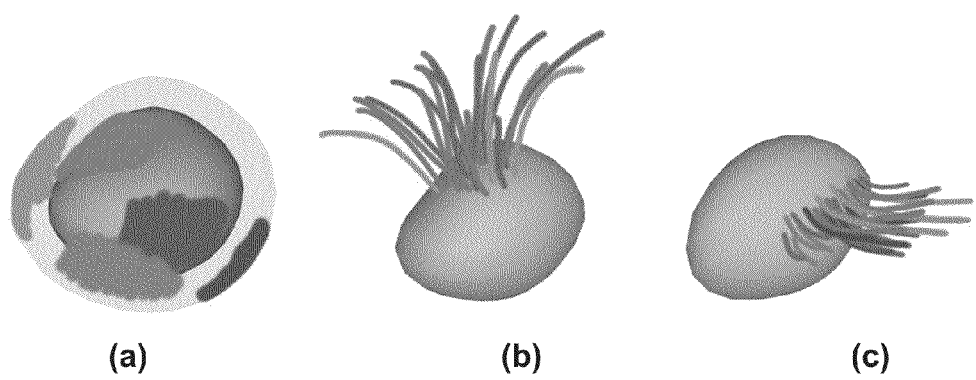
FIG. 5 illustrates examples of stroke embedding processes.

The objective terms presented in the previous section provide the ingredients necessary to implement three embedding tools. The use of these three tools is explained herein and examples of the results are shown in FIG. 5.

Level Set Tool: The level set tool embeds all stroke points as closely as possible onto a selected level set surface. FIG. 5(a) illustrates an example of what might occur if the level set objective is the main objective. This goal is achieved by giving a dominant weight to the level distance term, $E_{level}$. By itself, this term has the same effect as direct projection for paint strokes within the silhouette boundaries of the level set. When a stroke extends outside the silhouette, the closest distance solution will be roughly perpendicular to the surface in the region where the silhouette is crossed, thus creating a sharp corner along the embedded stroke. The angle term, $E_{angle}$, (described below) can be incorporated to achieve a smoother transition in this case. The weights $w_{level}=1$, $w_{angle}=0.1$, and $w_{length}=0$ were used for the level set tool in the generation of the example image of FIG. 5(a). If a fuzzy embedding is desired, the target level can be displaced by a random amount for each stroke, or even for each individual stroke point.

Hair and Feather Tool: Another set of tools allows the user to paint across level sets. The user selects a target level for both the start and the end of the stroke. The first and last points of a painted stroke are constrained to lie on these prescribed levels, i.e., $w_{level}=1$. The remaining stroke points, however, are optimized with $w_{level}=0$. In the absence of a target surface, the angle objective term ensures a smooth transition between the two ends with $w_{angle}=1$. With this term alone, the resulting embedding will be smooth, but may be extended undesirably in order to meet the angle criteria optimally, resulting in strokes that overshoot the prescribed target level set. The drawing system can use the arc length term as a regularization term with $w_{length}=0.05$ to regularize this behavior and cause a straighter embedding in space.

The resulting cross-level embedding can be controlled more explicitly with additional constraints. For example, the initial direction of the stroke can be prescribed by temporarily pre-pending an artificial stroke point. This point stays fixed during the optimization of the stroke, but affects the embedding solution through the angle objective term.

Depending on its relative position to the first actual stroke point, $p_1$, it will cause the embedded stroke to leave the surface in a particular direction. For the "hair" tool, the temporary point is placed along the negative gradient direction at $p_1$, causing the initial direction of the stroke to be perpendicular to the level set. The "feather" tool was realized by placing the temporary point in the direction that is tangential to the scalar field at $p_1$ and has the largest angle to the straight line connecting $p_1$ and $p_n$.

Distance, Derivative and Gradient Computations

In some embodiments, in the process of embedding strokes in space as described below, the optimization procedure repeatedly evaluates a canvas's scalar field and calculates the field's magnitude, $f(x)$, the gradient, $\nabla f$, and the derivative of the scalar field with respect to the ray parameter, $\partial f(p_i)/\partial t_i = \nabla f \cdot d_i$.

In the absence of sculpting operations, $f(x)$ is defined to be the smallest distance to the proxy geometry, which is designated as $f_{proxy}(x)$. This distance is computed by finding the closest point within any primitive of the proxy geometry mesh. The sign of the distance is found using the angle-weighted normals of the mesh primitives [Baerentzen]. The gradient is generally defined by the normalized vector between the query point x and its closest point on the surface. If x lies very close to or exactly on the surface, this definition becomes unstable, and the angle-weighted normal of the closest primitive is used instead.

All scalar field evaluations can be computed on the fly, so that field doesn't need to be stored in a discretized form. This might also be used in conjunction with a spatial acceleration data structure, such as an oriented bounding box tree [Gottschalk], which allows the embedding to be performed interactively.

Initialization and Refinement

To accelerate convergence and avoid inappropriate local minima, the drawings system might initialize the unknowns to lie on the front-most target level set of the scalar field using Sphere Tracing, a ray marching technique described by [Hart]. For the hair and feather tools, only the first and the last stroke points are initialized to their respective target levels, while the remaining unknowns are initialized with a linear interpolation between the two end points.

If a target surface or parts of it are at a considerable angle to the screen plane, the sampling of points along the stroke from the input device may not be sufficient for the stroke to be embedded nicely in the scalar field. For example, the level objective term can only be faithful to the chosen isosurface if the stroke sampling is fine enough for the level of detail of the surface. Likewise, the angle term can only provide an effective smoothing if the sampling is appropriate. The drawing system can be programmed to refine input strokes painted with the level set tool during their initialization. If the Euclidean distance between two consecutive stroke points after initialization is larger than a given threshold, a new stroke point is inserted halfway between the existing stroke points in 2D and immediately projected according to the initialization method described above. This step is repeated until all stroke segments are at most twice as long as the shortest segment in the stroke, thus guaranteeing a roughly uniform sampling along the stroke.

Figure 6A:
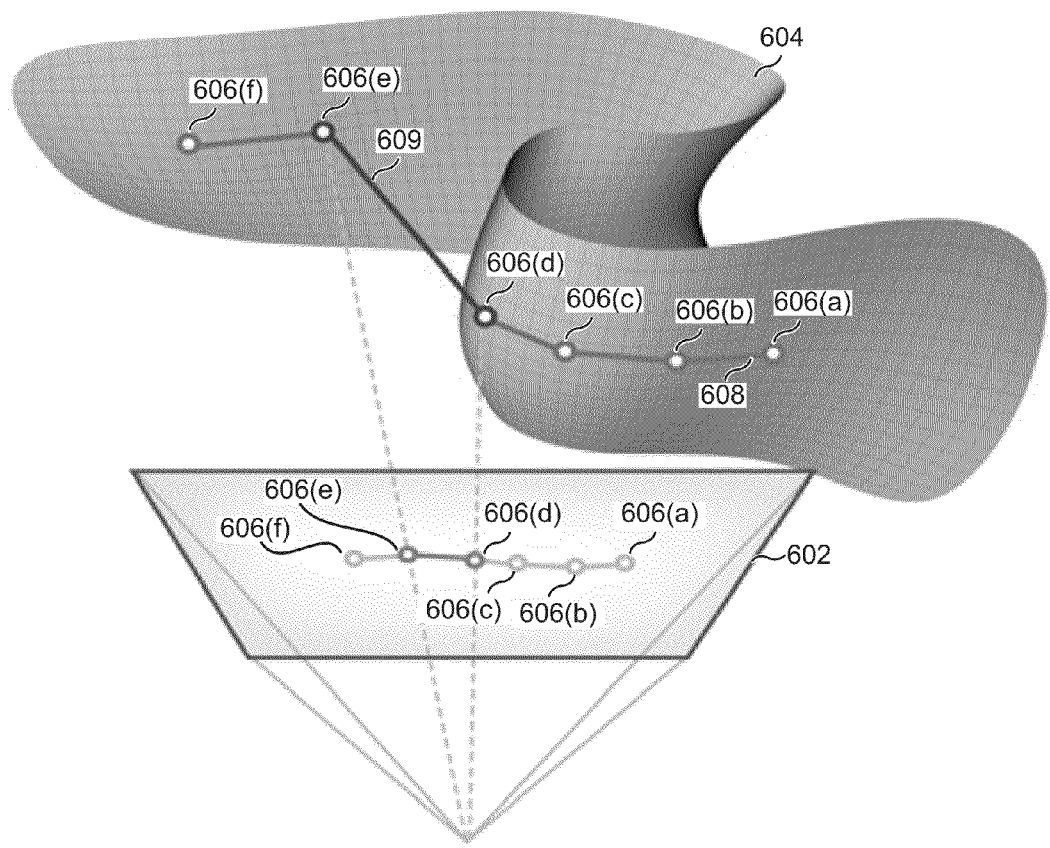
FIG. 6 illustrates three consecutive refinement steps of a paint stroke crossing an occluding contour of a target isosurface.
Figure 6B:
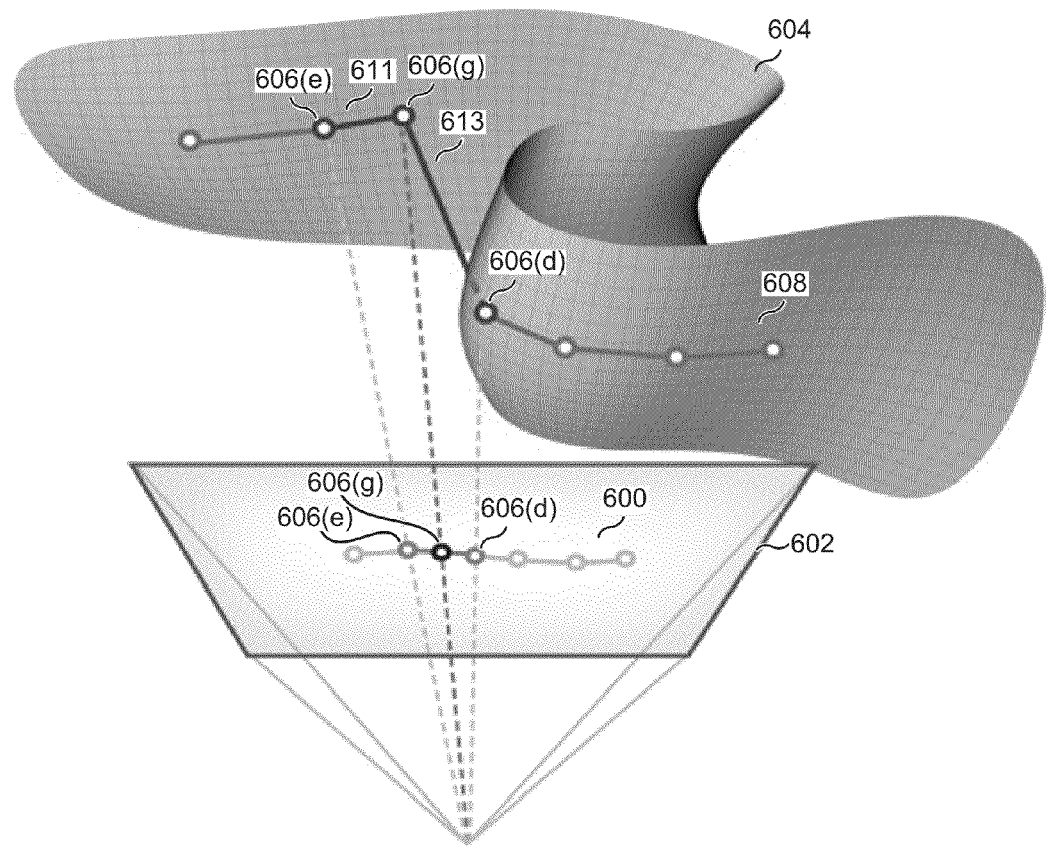
Figure 6C:
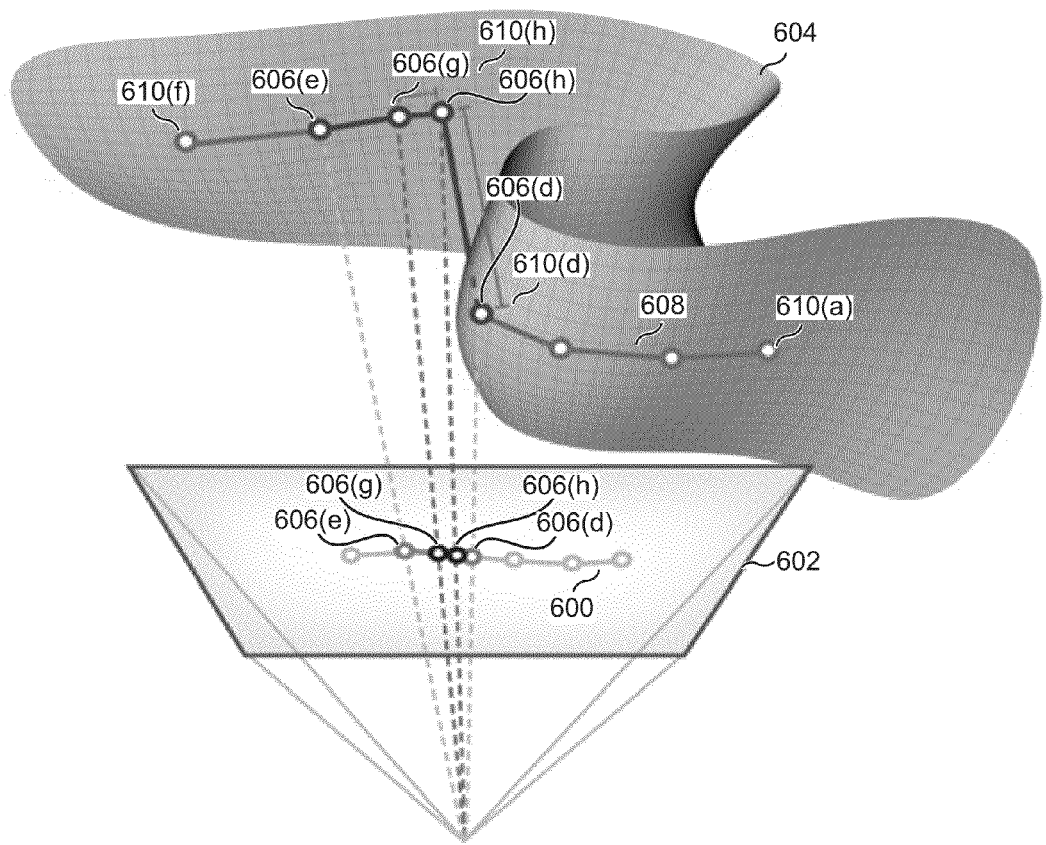

The refinement process has the added benefit of detecting strokes that cross occluding contours. This is illustrated in FIG. 6. FIG. 6 shows three consecutive refinement steps of a paint stroke 600 crossing an occluding contour of a target isosurface 604. As shown there, a stroke 600, drawn on an input plane 602 is to be embedded onto an isosurface 604. Stroke 600 is shown initially comprising stroke points 606(a), 606(b), 606(c), 606(d), 606(e), and 606(f). As illustrated, isosurface 604 has an occluding contour and an embedded stroke 608 that corresponds to stroke 600 spans that occluding contour.

Painting across occluding contours can result in stroke segments bridging two parts of an isosurface, which are potentially far apart in 3D. Attempting to refine such a segment causes an infinite recursion within a segment that cannot become any shorter. For example, stroke points 606(d) and 606(e) are far apart in 3D, so a refinement might be to insert a point halfway (measured in the input plane) between two points that are far apart. This is illustrated by inserted stroke point 606(g) shown in FIG. 6(b). Note that the points on stroke 608 corresponding to stroke points 606(g) and 606(d) are still far apart in 3D, so it might be further refined by adding in yet another stroke point 606(h). Eventually, the added points will converge at 606(d), but in 3D, they will project to two distinct 3D points (embedded points 610(h) and 610(d), in FIG. 6(c), for example).

Note that, in each step, the smaller sub-segment gets considerably smaller but the original segment might only get a little smaller, so their ratio declines. For example, as segment 609 that spans the occluding contour is refined and divided into a sub-segment along the isosurface (sub-segment 611 in FIG. 6(b)) and a sub-segment spanning the occluding contour (sub-segment 613 in FIG. 6(b)), the ratio of the isosurface portion to the spanning portion declines—the isosurface portion gets smaller and smaller, whereas the spanning portion will stay the same.

The 3D drawing system can detect this case by comparing the original segment length with the lengths of the two new segments. If the ratio is below a given threshold, the paint stroke is split into two strokes at the location of convergence, such as might occur if embedded stroke 608 in FIG. 6(c) were split into a stroke from point 610(a) to point 610(d) and a stroke from point 610(h) to point 610(f). We found that a value of 0.1 works well for the threshold ratio.

Sculpting

In the same way that paint strokes are embedded to add color to the canvas, the sculpting tool embeds sculpting strokes that alter the shape of the canvas itself. FIGS. 14(a)-(d) illustrate this. As explained above, FIG. 14(a) represents a scalar field that corresponds to distances from surface 1406 (shown in the figure as a curve). A sculpting tool might be used by an artist or user to modify the scalar field by modifying surface 1406.

FIG. 14(b) illustrates a representation of a scalar field that might result from the modification of surface 1406 wherein a "bump" 1408 was added. Note that the outer isosurfaces are affected by the addition of bump 1408, at least in a local area. The bump might be created by a sculpting change to surface 1406, which can also cause changes in inside and outside isosurfaces, or by a change to some isosurfaces that in turn cause changes to surface 1406. In other words, a bump can be placed on the surface or not on the surface and either way, has some effect on the scalar field.

FIG. 14(c) illustrates a representation of a scalar field that might result from another modification of the scalar field, wherein a slightly different displacement is made, and the scalar field is adjusted accordingly.

FIG. 14(d) illustrates the case where the scalar field sculpting is a subtraction from a surface rather than an addition. In these examples, sculpting is shown to modify the scalar field.

Sculpting strokes act as direct modifiers to the canvas' scalar field and thus have an influence on the embedding of subsequent strokes. A sculpting stroke defines a contribution function $C(r, R)$, where r is the smallest distance from x to any of the line segments of the sculpting stroke, and R is a user-defined radius of influence. The drawing system might use a cubic polynomial with local support, such as that described in [Wyvill] and shown in Equation 5.

$$C(r, R) = \begin{cases} 2\frac{r^3}{R^3} - 3\frac{r^2}{R^2} + 1, & \text{if } r < R \\ 0, & \text{otherwise} \end{cases} \quad \text{(Eqn. 5)}$$

The scalar field is modified by adding the contributions of all sculpting strokes to the field function, as in Equation 6, where j enumerates all sculpting strokes in the canvas with a non-zero contribution at x, and $K_j$ determines the magnitude and direction of each sculpting operation.

$$f(x) = f_{proxy}(x) - \sum_j K_j C(r_j, R_j), \quad \text{(Eqn. 6)}$$

The contribution functions locally change the magnitude of the scalar field gradient. The amount by which a surface is shifted by a sculpting operation therefore depends both on $K_j$ and previous sculpting operations in the region. The drawing system can maintain the magnitude of the surface deformation approximately constant by setting $K_j$ to the scalar field at a user-chosen distance in gradient direction from the stroke centerline.

Once a sculpting stroke has been embedded, it is incorporated into the evaluation of the canvas's scalar field. As a consequence, the scalar field values no longer represent the distance to the zero level set. The gradient of the scalar field is augmented by the sculpting contribution functions, as illustrated by Equations 7 and 8.

$$\nabla f(x) = \nabla f_{proxy}(x) - \sum_j K_j \nabla C(r_j, R_j) \quad \text{(Eqn. 7)}$$

$$\nabla C(r, R) = \begin{cases} 6\frac{r^2}{R^3}\frac{\partial r}{\partial x} - 6\frac{r}{R^2}\frac{\partial r}{\partial x}, & \text{if } r < R \\ 0, & \text{otherwise} \end{cases} \quad \text{(Eqn. 8)}$$

The ray marching procedure used to find an initial embedding solution requires a lower bound of the Euclidean distance to the target level set, l, to determine its step size. If the query point x is not within the influence region of any sculpting strokes, a practical lower distance bound is the minimum between the distance to the closest sculpting stroke and $f_{proxy}(x)-l$. Otherwise, the drawing system can use a distance bound derived according to [Hart], as illustrated by Equation 9, where the lower part of the fraction is the Lipschitz constant of the signed distance field of the proxy geometry (which is equal to 1) plus the Lipschitz constant of the sum of all contributions of the sculpting strokes.

$$d(x, S) >= \frac{f(x) - l}{1 + \sum_j |K_j|\frac{3}{2R_j}} \quad \text{(Eqn. 9)}$$

To provide immediate feedback of the sculpting operations to the user, the 3D drawing system deforms a copy of the proxy geometry by moving affected vertices along their normal to the new zero level set. If necessary, the mesh is refined to account for geometric complexity added by the sculpting tool. This copy need only be used for display, while future scalar field computations use the original proxy geometry together with the sculpting stroke influence functions directly (Equation 6).

Rendering

As described above, paint strokes are rendered after projecting their centerlines onto the view plane. A small textured quad representing the paint brush is moved along the stroke and repeatedly composited into the image with the "over" operator. For each view change, the drawing system can redraw all strokes and can perform rendering at interactive refresh rates for scenes with hundreds of thousands of splats (See FIG. 13).

A complication is introduced by conflicting rules for the overlap order of paint strokes. The classic 2D painting metaphor requires paint strokes to be placed on top of each other in the order that they were originally painted. The semantics of the underlying 3D object, on the other hand, prescribe that strokes from different surfaces should be rendered in depth order. Locally, one expects strokes to be rendered in the sequence that they were painted, while globally they must adhere to depth order.

The drawing system can address this conflict by sorting all splats according to a modified depth value before rendering. This modified depth value is taken from a shifted centerpoint position, as represented in Equation 10, in camera space, where $p_k$ and $d_k$ are interpolated from the stroke points.

$$q_k = p_k + C \cdot n \cdot d_k \quad \text{(Eqn. 10)}$$

The interpolated direction represents the view rays along which the stroke points were initially embedded. The integer n is an identifier of the stroke sequence, which is increased by one for each stroke that is drawn. The stroke order is therefore translated into a depth offset, but this modified depth value is only used for splat sorting. A constant rendering parameter C scales the magnitude of the depth offsetting.

Examples of Rendering Results Using the Drawing System

Various figures illustrate results of several test 3D paintings created by users using the drawing system. For such paintings, the artists modeled approximate proxy geometry in either Maya [Maya] or ZBrush [ZBrush] and imported it into the drawing system for painting. The proxy geometry does not include fine details. Instead, the artists achieved the detailed result by painting strokes with the level set, hair, and feather tools, or sculpting additional details with the sculpting tool.

The "Cat and Mouse" painting of FIG. 1 is shown from three different viewpoints, 100(*a*), 100(*b*) and 100(*c*). Note that the cat's tail is depicted with strokes that do not conform to the proxy geometry's surface. By painting off surface, the artist gave the tail its rough, comic look. The whiskers on the cat and mouse demonstrate strokes painted in space using the hair tool.

Figure 7:
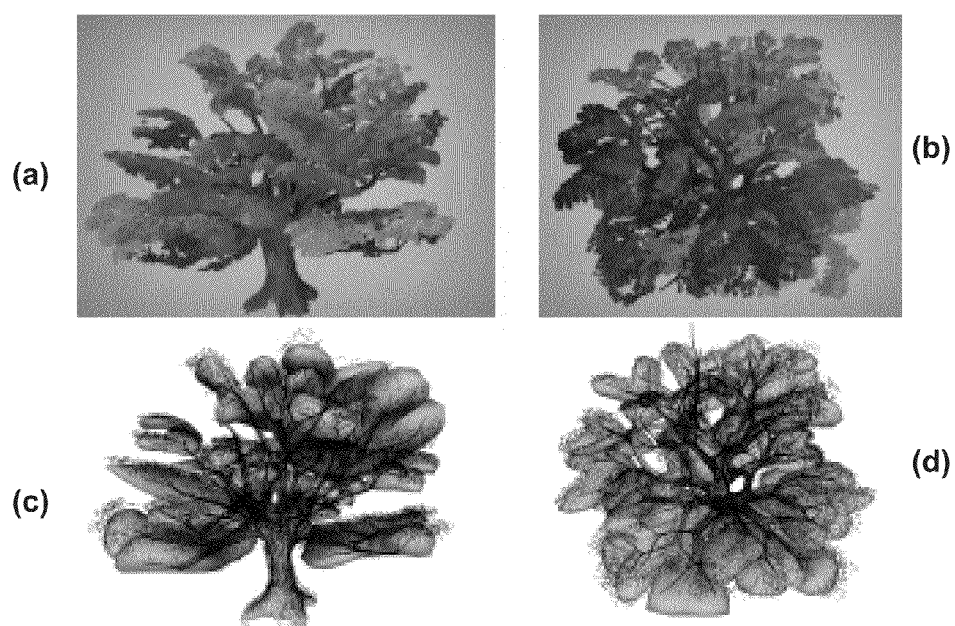
FIG. 7 illustrates a tree drawing using strokes for leaves.

FIG. 7 depicts an "Autumn Tree" from front and top views. In FIGS. 7(*c*) and 7(*d*), renderings of the stroke centerlines are blended with the proxy geometry. It shows that the leaves are painted in the space surrounding the rough canopy geometry. Leaves are individually painted strokes on offset levels of rough geometry representing canopies.

Figure 8:
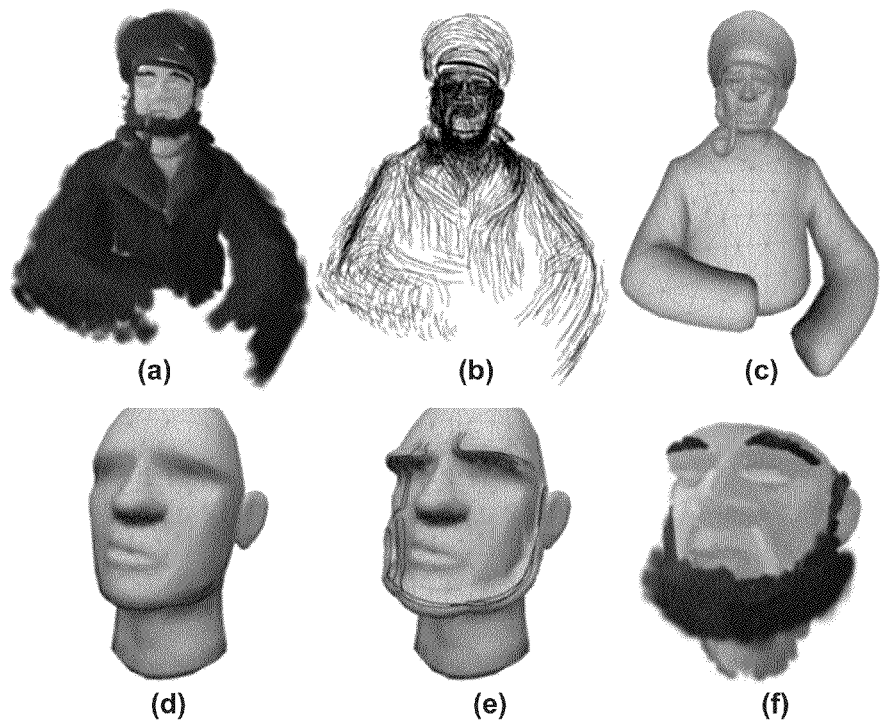
FIG. 8 illustrates hair and fur painting.

FIG. 8 depicts a captain character. The sculpting tool was used to sculpt the captain's beard and eyebrows. The bottom row of FIG. 8 (FIGS. 8(*d*), (*e*) and (*f*)) illustrates the original, unsculpted head, the sculpting strokes, and the final painted result, respectively.

Figure 9:
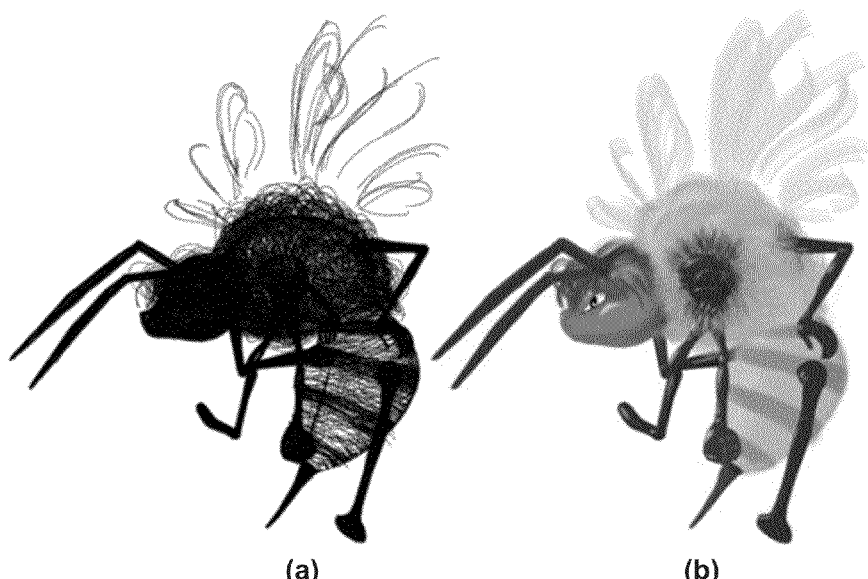
FIG. 9 illustrates other aspects of an embedding process.

FIG. 9 illustrates an "Angry Bumble Bee" character and shows how the hair and feather tools can be used to create a fluffy appearance. The drawing system can be used to create other structure that may not be easily representable using textured meshes.

FIG. 11 illustrates a "Wizard vs. Genie" painting, wherein facial features and cloth wrinkles were sculpted using the 3D drawing system's sculpting tool, and the smoke was given a fuzzy appearance by enabling the random-offset feature of the level set tool. Since the drawing system can have a unifying representation for both surface and space, it is easy to paint clouds and other volumetric effects, by painting on offset surfaces. Effects such as the clouds in these images would be difficult to achieve with texture painting techniques. The beard in the rightmost image (FIG. 11(*c*)) shows an exemplary use of the feather tool.

FIG. 12 illustrates proxy geometries used for various embedding operations illustrated by other figures.

Figure 10:
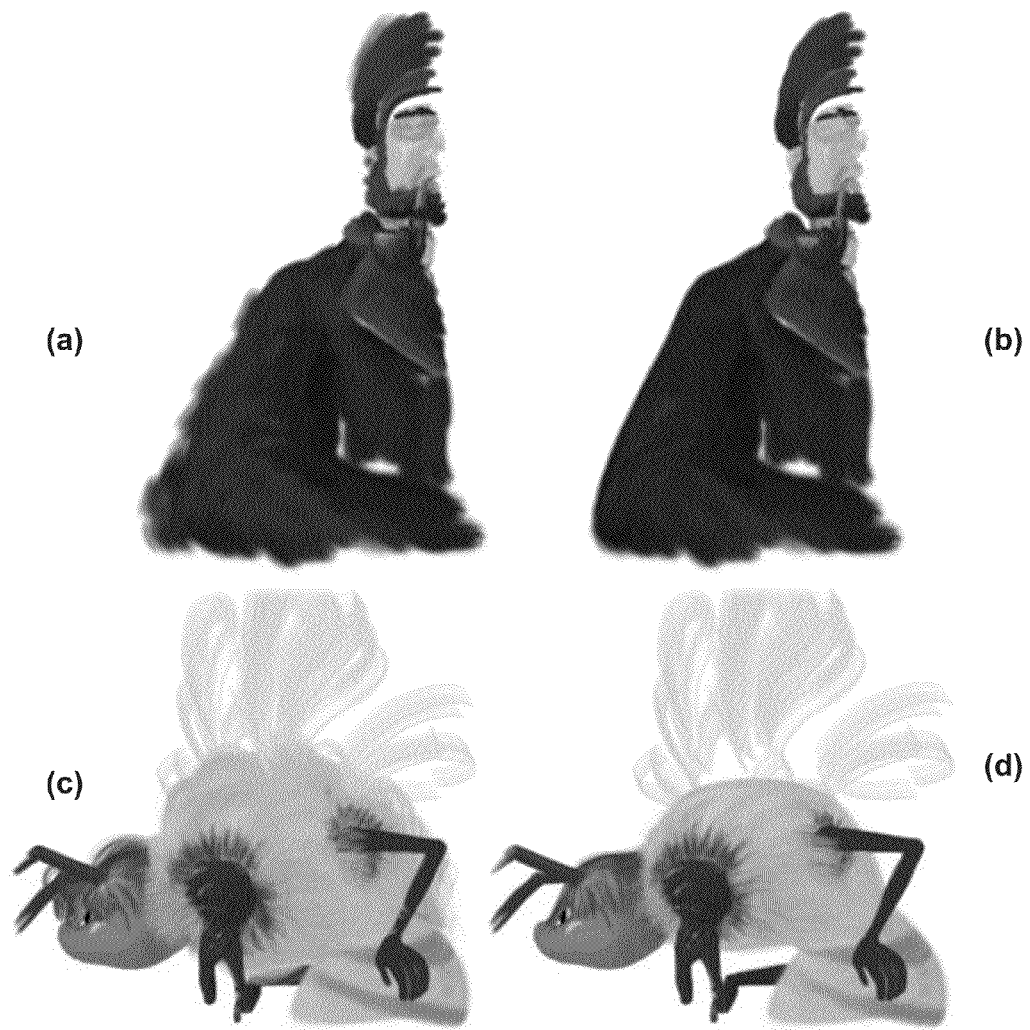
FIG. 10 illustrates other aspects of an embedding process.

FIG. 10 demonstrates some advantages over more traditional methods that restrict 3D paintings to conform tightly to the surface of scene objects. FIGS. 10(*a*) and (*c*) shows the 3D painting as created by the artist, while FIGS. 10(*b*) and (*d*) represent the paintings with all paint strokes reprojected onto the zero level set so that they lie exactly on the proxy geometry. In the reprojection, the silhouette of the captain's arm becomes a precise line without stylization, revealing the smooth nature of the underlying 3D geometry. Likewise, the bee's fuzzy body and hairstyle lose their expressive quality.

FIG. 13 is a table illustrating statistics from various test runs for image elements shown in other figures. The paintings range in complexity from 5,000 to 24,000 strokes. The "Triangle" column indicates the triangle count of the proxy geometry for each example. The "Strokes" column indicates the total number of paint strokes in the scene. The "Splats" and "Time" columns indicate the number of splats and the rendering time for a representative view rendered with 1280×720 pixels, respectively. In tests, the renderer was able to maintain interactive frame rates for each of these paintings.

The present invention relates generally to image generation and more specifically to image generation (whether individual images or animation sequences of images) based on elements that include simulated painting strokes represented in a three-dimensional space.

Mixed-Order Compositing in Rendering

A renderer generates one or more images from objects and elements of a scene and can do so by considering, for each pixel of an image, the objects and elements that intersect a ray from a camera viewpoint through that pixel. When there are multiple intersections, the renderer composits the fragments of those objects and elements that intersect. The placement of strokes might be done using the stroke embedding methods and apparatus described herein.

In the presence of a well-defined ordering, fragments or layers are typically composited using the over operator described by [Porter]. With the over operator (denoted here by $\oplus$), given two fragments whose colors and $\alpha$'s are $(h_1, \alpha_1)$ and $(h_2, \alpha_2)$, the over operator is as shown in Equation 11.

$$(h_1, \alpha_1) \oplus (h_2, \alpha_2) = \left( \frac{h_1 \alpha_1 + h_2(1-\alpha_1)\alpha_2}{\alpha_1 + (1-\alpha_1)\alpha_2}, \alpha_1 + (1-\alpha_1)\alpha_2 \right) \quad \text{(Eqn. 11)}$$

It is common to use the premultiplied-alpha representation, storing $c = h\alpha$ instead of $h$. This simplifies the expression to that of Equation 12.

$$(c_1, \alpha_1) \oplus (c_2, \alpha_2) = (c_1 + c_2(1-\alpha_1), \alpha_1 + (1-\alpha_1)\alpha_2) \quad \text{(Eqn. 12)}$$

In the examples herein, the premultiplied-alpha representation is used, treating $\oplus$ as a three-vector, but in some embodiments, vectors need not be used. In some implementations, $\beta = 1-\alpha$ can be stored instead of $\alpha$, which further simplifies the over operator to the result of Equation 13, illustrating that $\oplus$ is associative, but not commutative.

$$(c_1, \beta_1) \oplus (c_2, \beta_2) = (c_1 + c_2\beta_1, \beta_1\beta_2) \quad \text{(Eqn. 13)}$$

FIG. 16 illustrates what might happen if a less than optimal ordering is used for compositing. In that figure, paint strokes were placed on one surface 1602 to form the letter "A" overlaid on a background set of paint strokes 1604, while another set of paint strokes were placed on another surface 1606 to form the letter "B" overlaid on a background set of paint strokes 1608. In this example, suppose that the strokes on surface 1606 were all input after the strokes on surface 1602. Strokes might be rendered as a collection of individual splats.

FIG. 16(*a*) shows surfaces 1602 and 1606 from the side, illustrating their depth separation. FIG. 16(*b*) shows the desired compositing result, with the "A" and its background in front of the "B" and its background. FIG. 16(*c*) is what results from compositing in strict depth order. Compositing purely in depth order can lead to Z-fighting and can preclude the artist from painting over existing strokes and thus ignores an important part of the 2D painting metaphor. Note that some of the background strokes obscure some of the foreground letter strokes. FIG. 16(*d*) is what results from compositing in strict stroke order.

Desired Properties for a Mixed-Order Compositor

As with regular compositing, mixed-order compositing can work independently on each pixel. In these examples, a single pixel is considered at a time by a renderer. Suppose that the rasterization deposited a set of n fragments at a pixel. Each fragment has a color $c_i$, an opacity $\alpha_i$, a depth $z_i$, and a stroke number $s_i$. Herein, the expression $f_i$ denotes the entire fragment $(c_i, \alpha_i, z_i, s_i)$. The fragments can be taken in depth order, starting with the closest to the viewer (i.e., the camera viewpoint), so that $z_i \leq z_{i+1}$. Assume that the stroke numbers $s_i$ range between 1 and n and that no two fragments in a pixel have the same stroke number.

A compositing function, $C(f_1, f_2, \ldots, f_n)$ can satisfy the following four properties to be a good compositing function and provide pleasing results for animation and/or viewpoint movement.

Property 1: Since fragments at the same depth can be considered as being on the same surface, the compositor should composite fragments at the same depth in stroke order, i.e., if two fragments i and i+1 have the same depth and are adjacent in stroke order, i.e., $z_i = z_{i+1}$ and $s_i = s_{i+1} + 1$, replacing them with their composite in stroke order should not change the final output for the pixel. In other words, Equation 14 should be met.

$$C(f_1, f_2, \ldots, f_n) = C(f_1, \ldots, f_{i-1}, f_i \oplus f_{i+1}, f_{i+2}, \ldots, f_n) \quad \text{(Eqn. 14)}$$

Property 2: Fragments that are sufficiently separated in depth should be treated as being on different surfaces, and the surfaces can be composited in depth order. The threshold separation might be a user-specified parameter, a distance d. In that case, fragments farther than d apart in depth are treated as being on different surfaces and composited separately in depth order. Thus, for this property, if for some i, $z_{i+1} \geq z_i + d$, then the compositing function used is as in Equation 15.

$$C(f_1, f_2, \ldots, f_n) = C(f_1, \ldots, f_i) \oplus C(f_{i+1}, \ldots, f_n) \quad \text{(Eqn. 15)}$$

Property 3: A fully transparent fragment should have no effect. Thus, for this property, if for some i, $a_i = 0$, then Equation 16 should hold.

$$C(f_1, f_2, \ldots, f_n) = C(f_1, \ldots, f_{i-1}, f_{i+1}, \ldots, f_n) \quad \text{(Eqn. 16)}$$

These first three properties can be satisfied by sorting the fragments in lexicographical order by depth and then by stroke number. However, during animation and/or camera viewpoint movement, the transparencies, the depths, and the colors may change and might result in popping or other artifacts.

Property 4: The mixed-order compositing function C should be continuous over color (the $c_i$'s), transparency (the $a_c$'s) and depth (the $z_i$'s).

To the extent these four properties are met, a desirable rendering and animation can be expected. However, not every function C that satisfies these properties is necessarily a good compositing function. For instance, C may exhibit undesirable behavior when all $z_i - z_{i-1}$ approach d/2 because this configuration is sufficiently far from the premises of Properties 1 and 2. Nevertheless, in some experiments, artifacts can be explained in terms of violations of these properties for natural candidates for C.

Simply compositing the strokes in depth order violates Properties 1 and 4. Rendering by offsetting the depth of fragments by a function of stroke order before compositing them in depth order does not satisfy Properties 2 and 4, as offset surfaces may poke through closer surfaces, and popping can occur when the offset fragments switch depths. It also fails to satisfy Property 1 because two strokes at the same depth with adjacent stroke numbers may "sandwich" a third stroke after the offsets are computed.

Use of a blurred depth test for smooth compositing and/or use of a hard depth map violates Properties 2 and 3, making such methods unsuitable for partially transparent fragments. The use of depth-dependent compositing in those methods can lead to a violation of Property 4, resulting in popping artifacts in animations.

Other approaches may have difficulty meeting all four properties.

A Compliant Compositing Function

A compositing function that meets the four properties above will now be described. In one embodiment of the method and apparatus of a rendering system, the image details and strokes are stored in memory such that the colors of fragments that intersect a view ray can be determined. Then, each color (of all of the fragments or some part of them, if not all are processed) is replaced with the result of compositing nearby fragments in stroke order, and then the fragments with replaced colors are composited in depth order. Its implementation requires some careful attention to ensure continuity and good performance. Techniques to satisfy that are described herein.

The user or some other portion of the system specifies a global constant, d, so that fragments farther than d apart only composite in depth order (or d might be generated in another way). The compositor then uses the function $S(z) = (S_c(z), S_a(z))$ that is the result of compositing all fragments with depths strictly between $z-(d/2)$ and $z+(d/2)$ in stroke order. When there are no fragments between $z-(d/2)$ and $z+(d/2)$, define S to be the identity color, (0,0) (or (0,0) where the color is a vector—it should be understood that color values, whether bolded or not, can be vectors or scalars). S is a piecewise-constant function with discontinuities at $z_i+(d/2)$ and $z_i-(d/2)$. If we assign a new color to each fragment using $S(z_i)$, there would not be continuity with respect to $z_i$'s. Instead, the compositor smoothes $S(z_i)$ in depth by convolving it with a box filter of width $\gamma d$, where $\gamma$, with $0 < \gamma \leq 1$, specifies how much smoothing is performed. The colors and alphas can then be computed according to Equation 17.

$$(c_i', a_i') = \frac{1}{\gamma d} \int_{z_i - \frac{\gamma d}{2}}^{z_i + \frac{\gamma d}{2}} S(z) \, dz. \quad \text{(Eqn. 17)}$$

Note that because the colors are premultiplied with alphas, this integral is correctly weighted by alpha. Replacing the fragment colors, while keeping their original alpha values, results in Equation 18.

$$c_i'' = \frac{c_i' \alpha_i}{a_i'} \quad \text{(Eqn. 18)}$$

Note that because $S_\alpha(z) \geq \alpha_i$ over the range of integration, we have $\alpha_i \leq \alpha_i'$ and the division of Equation 18 is well-behaved for nearly-transparent fragments. The final output is $C(f_1, \ldots, f_n) = (c''_1, \alpha_1) \oplus \ldots \oplus (c''_n, \alpha_n)$. Although the final output is composited in depth order, C does not exhibit discontinuities when the depth order changes because two fragments at the same depth will have the same replacement color.

It should be understood that where the details explain that "we" take an action, the action can be done by a programmed computer, software or hardware, for example, using conventional computers.

Exemplary Process for Computing a Compositing Function

We now describe a process for computing a compositing function C efficiently in O(n log n) time and using O(n) memory. A high-level procedure explicitly computes S(z) in O(n log n) time and then define the replacement colors in linear time. Naïve algorithms for both of these parts run in quadratic time because each distinct value of S can depend on all n fragments, and each replacement color can depend on all $\Omega(n)$ distinct values of S. The proposed method instead sweeps across depth and exploits the problem structure to compute values of S and replacement colors (C', α') incrementally.

As used herein, "algorithm" should be understood as a set of steps that can be part of a computer program or other processing element to perform the explained task. It should be generally understood that most of these operations are impractical for other than electronic or computational device implementation.

Figure 17:
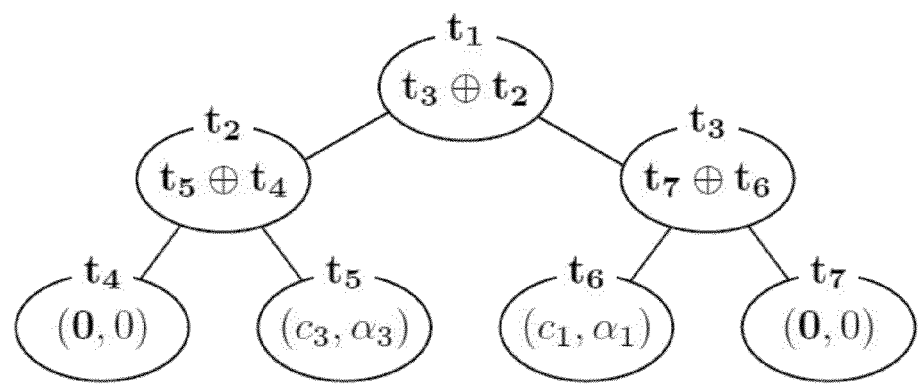
FIG. 17 illustrates a binary tree that can be used as part of a compositing process.

We start by using a sort to assign fragments distinct stroke numbers from 1 to n. As previously noted, S(z) only changes at $z_i+(d/2)$ and $z_i-(d/2)$ and therefore it only needs to be computed at these locations. At $z_i-(d/2)$, S is modified to include the new fragment $z_i$ and at $z_i+(d/2)$, S changes to no longer include $z_i$. To accommodate these events, we use a data structure that maintains a subset of the fragments and can add or remove a fragment from the subset efficiently. It also reports the composite of this subset in stroke order. We use a complete binary tree with n leaves, each node of which stores a color and alpha, initially (0, 0). Leaf $s_i$ of the tree stores either (0, 0) or $(c_i, α_i)$, and each internal node stores the composite of its children in reverse order (because later strokes go on top). The root therefore stores the composite of all of the leaves of the tree in stroke order. Inserting or deleting a fragment can be achieved by changing the appropriate leaf from (0, 0) to $(c_i, α_i)$ or vice versa and updating all of the nodes on the path to the root. FIG. 17 illustrates this. These updates therefore run in O(log n) time.

FIG. 17 illustrates a binary tree that can be used as part of a compositing process, in computing S(z) efficiently. In the binary tree, the leaves correspond to four fragments in a pixel. At the time instant shown, fragments 1 and 3 (with $s_1=3$ and $s_2=2$) are in the window. Suppose fragment 2 enters the window and $s_2=4$. This requires an update of the nodes $t_7$, $t_2$, and $t_1$ for the root to have the correct new S(z).

Figure 18:
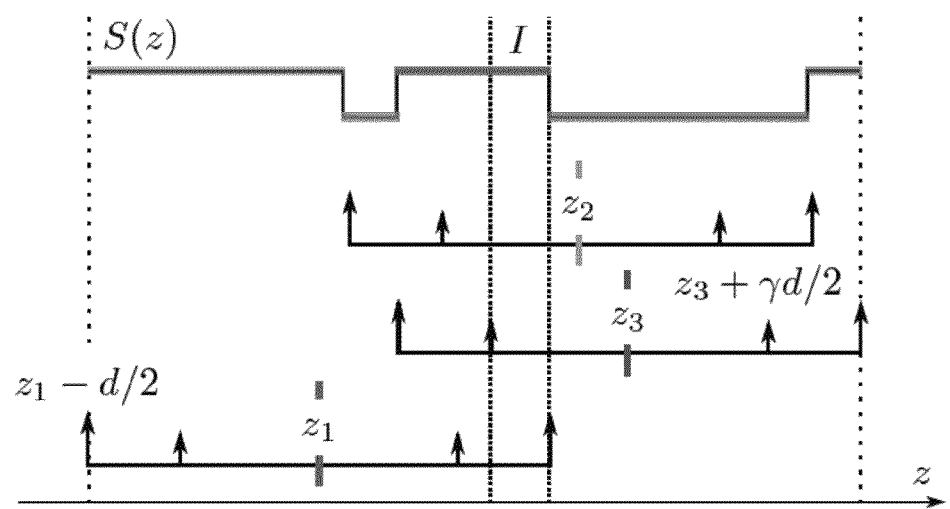
FIG. 18 illustrates a process for determining replacement colors.

With S(z) known, its integral can be computed over a window of size γd around each fragment, as illustrated in FIG. 18.

FIG. 18 illustrates a process for determining replacement colors. In that figure, three fragments are shown with their compositing windows (±d) and box filter windows (±γd). The stroke order is $z_1$, $z_3$, $z_2$. During the integration, the contribution of the interval I is added to the replacement colors of fragments $z_2$ and $z_3$. The vertical axis does not denote anything and is used to make the illustration less cluttered.

Consider the union of the set of discontinuities of S and the points $$z_i \pm \frac{\gamma d}{2}.$$

This union partitions the interval $$\left[ z_i + \frac{\gamma d}{2}, z_n + \frac{\gamma d}{2} \right]$$

into at most 4n subintervals. Within such a subinterval I, S(z) is constant by construction. The set of fragments within (γd/2) of z is also constant and contiguous, comprising all fragments from $z_j$ to $z_{j+k}$, for some j and k. The contribution of I to each fragment in this set is S(I)/γd times the length of I. Because k may be as large as n, adding this contribution to all fragments is too expensive. However, if we maintain the integrals as differences between adjacent fragments, $(\Delta c'_j, \Delta α'_j)=$ $(c'_j-c'_{j-1}, α'_j-α'_{j-1})$, we can add the contribution to $(\Delta c'_j, \Delta α'_j)$ and subtract it from $(\Delta c'_{j+k+1}, \Delta α'_{j+k+1})$ in 0(1) time. We process all 4n subintervals by sweeping over the discontinuities of S and the points $$z_i \pm \frac{\gamma d}{2}$$

and incrementally maintaining j and k. Before doing the final composite, we compute $(c'_i, α'_i)$ from the deltas by computing the prefix sum.

Selected Experimental Results

Figure 19A:
FIG. 19 illustrates examples of 3D painting output.
Figure 19B:
Figure 19C:

Methods and apparatus for mixed-order compositing described herein were tested on a variety of 3D paintings. FIG. 19 shows some of these results; FIG. 19(a) being a tree, FIG. 19(b) being a cat (and mouse), and FIG. 19(c) being a bee.

Figure 20:
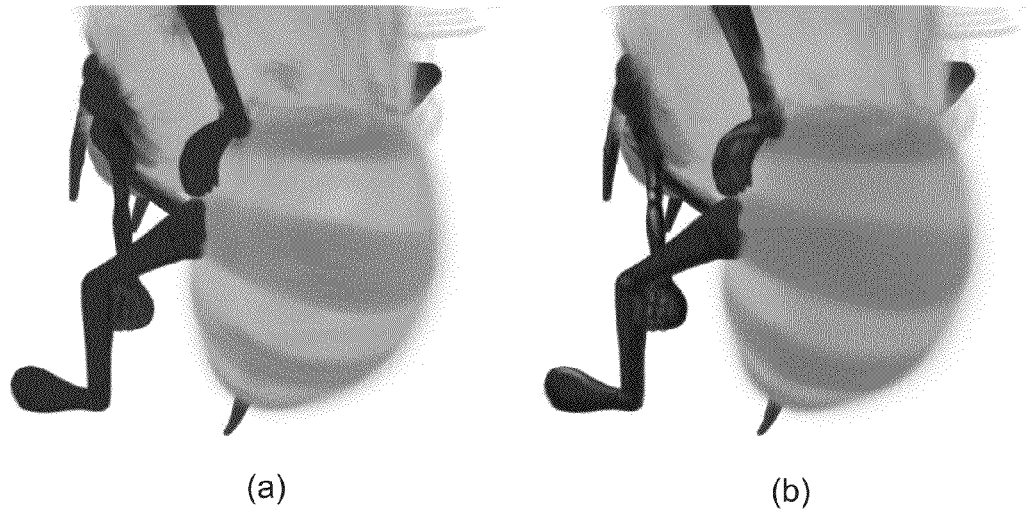
FIG. 20 illustrates a comparison of methods for compositing, using objects forming a bee.
Figure 21:
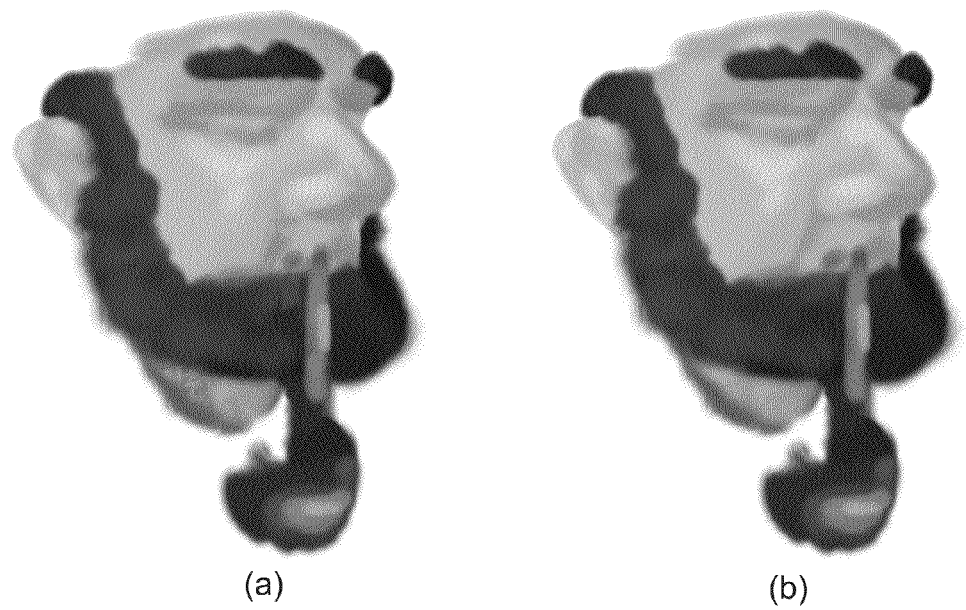
FIG. 21 illustrates a comparison of methods for compositing, using objects forming a captain's head.

FIGS. 20-21 illustrate some of the artifacts that can be seen when depth offsetting or clustering is used to resolve an ordering conflict.

FIG. 20 illustrates a comparison of methods for compositing, using objects forming a bee. FIG. 20(a) shows results of depth offsets. Note the artifacts on the bee's limbs and abdomen. FIG. 20(b) shows mixed-order compositing.

FIG. 21 illustrates a comparison of methods for compositing, using objects forming a captain's head. Optimal parameters have been manually chosen for each process. FIG. 21(a) shows results of clustering. Note the artifacts on the captain's neck, mouth, and nose regions. FIG. 21(b) shows mixed-order compositing.

The scene statistics and timings for a C++ implementation running on a single core of a Core i7 2.8 GHz processor with 12 GB of RAM are given in the table in FIG. 22. The fourth column shows the total number of fragments processed, while the fifth column lists the largest number of fragments of a single pixel. In the last (sixth) column, the time used for compositing with a method presented in herein is given. These statistics are for a scene rendering with 960 by 720 pixels.

Additional Variations for Mixed-Order Compositing

For large scenes, where d is much smaller than the depth range, the running time can be improved (assuming fragments are given in depth order) to O(n log m), where m is the maximum number of fragments in an interval of length d. The bottleneck is the computation of S(z), which can be sped up by maintaining the fragments to be composited in stroke order in a dynamic binary tree, such as a red-black tree or a splay tree instead of a static binary tree. For many scenes, the higher hidden constants of the dynamic binary tree would eclipse the potential improvement, so this would not be warranted, but it can be used where warranted.

In terms of memory, the compositor can be configured so that each step of the process can be made to stream over depth, so by interleaving the stages of the method, memory usage can be improved to O(m), if that is needed. Other optimizations, if needed, might include compositing nearby fragments in stroke order (with bounds on the maximum incurred error) and discarding fragments obscured by other fragments closer to the viewer.

This method can be implemented using a general purpose processor and program code for the steps of the method, or the method might be implemented as a set of GPU instructions provided to a graphics processing unit optimized for graphics operations. Interactive frame rates are possible.

In some cases it can be useful to vary d with depth. For example, wide brush strokes may need to be composited in stroke order over a larger window than thin brush strokes. The methods described herein could be used with a variable window size d(z) as long as it satisfies the Lipschitz condition $|d(z_1)-d(z_2)|<|z_1-z_2|$. This condition guarantees that no window completely contains another and allows for the efficient computation of replacement colors.

Complex Operations

In the basic method, the compositor assumes that fragments close together in depth are on the same surface and should thus be composited in stroke order. This works well the vast majority of the time, but it may lead to unintuitive results in cases where the artist has interleaved drawing on different surfaces and if the surfaces pass through each other. Although surfaces cannot be reliably identified in general, if information about distinct surfaces is available, in can be used for improving certain results.

For some applications, the stroke order is irrelevant and only a temporally-coherent depth-order compositing that satisfies Properties 2-4 is needed. For such a case, S(z) can be modified as in Equation 19, leaving the rest of the process unchanged.

$$S(z) = \sum_{\{i \mid z - \frac{d}{2} < z_i < z + \frac{d}{2}\}} (c_i, \alpha_i) \qquad \text{(Eqn. 19)}$$

Together with the box filter, the effect is that the replacement color is the average of the original fragment colors weighted by a trapezoid. This method can be computed in $O(n)$ time (because the tree is not necessary for sums) if the fragments are given in depth order.

Other Variations

In some variations, the artist need not paint all lighting and texture information by hand, but might include automated inclusion of scene lighting and shading information. In some variations, view-dependent geometry, such as that by [Rademacher], is incorporated into the 3D canvas authoring process. In some variations, layering, masking, and compositing are included features. In some variations, animation of paintings is possible. Paint strokes could be transformed according to animated proxy objects using space deformation techniques or by exploiting the point-to-surface correspondence given by the distance field.

In yet other variations, the mixed-order compositing uses fragments that are not from paint strokes, or some that are and some that are not. For example, fragments can come from simulated paint strokes, rasterized triangles, or the like. In the case of simulated paint strokes, the placement order, or "local precedence" order may correspond to an order in which the simulated paint strokes are deemed to be "painted onto" the image. In the more general case the placement order might or might not relate to the concept of an order of being painted onto an image, but more generally of being placed or having precedence.

CONCLUSION

We have presented a system that bridges the worlds of 2D raster painting and 3D rendering by generalizing the 2D painting metaphor to the third dimension in a way that empowers the artist to create a new class of expressive 3D paintings. An implicit canvas can be shaped by the artist through the creation of approximate proxy geometry, as well as optimization for stroke embedding. New workflows for 3D painting can be provided.

In some embodiments, animation might be painted using similar techniques. Space deformation techniques can be used to this end, or using the point-to-surface correspondence given by the distance field to transform the strokes according to animated proxy models. Some embodiments might bypass proxy model animation and allow the user to bring paintings to life by creating animations directly within the painting interface.

3D paintings hold great potential as an expressive medium that allows an artist to make use of 3D structure without being bound by limitations of the traditional 3D pipeline. A sound rendering and compositing method is desirable for 3D paintings, especially animated 3D paintings, to gain wider use and realize this potential.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. In a computer-implemented image generation system, wherein image elements are provided to a processor for rendering into an image and wherein at least some of the image elements correspond to fragments, a method comprising:

for each of a set of fragments, determining characteristics of the fragment, wherein characteristics comprise at least a position of the fragment in a three-dimensional virtual space, at least one color of the fragment, and at least one alpha value for at least one portion of the fragment;

for at least two fragments of the set of fragments, determining a depth order in which simulated depth is represented;

for each of at least a plurality of pixels, determining a pixel color value by:

(a) determining a set of intersecting fragments for that pixel, wherein the intersecting fragments are the fragments from the set of fragments that intersect a view ray for that pixel;

(b) assigning an intermediate color to each of the fragments in the set of intersecting fragments, different than the initial color of the fragment for at least one fragment, wherein the assigned intermediate color corresponds to a first compositing of nearby fragments in placement order, wherein the fragments are simulated paint strokes, wherein the placement order corresponds to an order of simulated paint strokes being applied to the image, and wherein assigning the intermediate color to each of the fragments in the set of intersecting fragments comprises:
  assigning a distinct stroke number to each of the fragments, wherein the stroke number identifies the placement order in which the fragment was created;
  generating a binary tree having a plurality of nodes, wherein the plurality of nodes comprise a leaf node for each of the fragments and at least one internal node, wherein the at least one internal node comprises a composite of its children nodes, and wherein each of the plurality of nodes comprises a color value and an alpha value; and
  (c) assigning a color to the pixel that corresponds to a second compositing of the fragments using the intermediate colors assigned to the fragments, wherein the second compositing is done in depth order.

2. The method of claim 1, further comprising, for each pixel:
  determining which of a set of simulated paint strokes intersects a view ray for that pixel; and
  for at least a plurality of the intersecting simulated paint strokes, determining a depth order with respect to the view ray and a stroke order among the plurality of the intersecting simulated paint strokes.

3. The method of claim 1, further comprising sweeping across a depth to compute values of intermediate functions and intermediate colors incrementally.

4. The method of claim 1, further comprising:
  obtaining a user-specified depth window size; and
  adjusting grouping of nearby fragments in the first compositing based on the user-specified depth window size, such that two fragments adjacent in depth but separated by more than the user-specified depth window size are placement-order composited separately from each other.

5. The method of claim 4, wherein the first compositing with the depth window is done using a box filter.

6. The method of claim 5, wherein the box filter has a bandwidth proportional to a depth window width and proportional to a user-specified smoothing parameter.

7. The method of claim 1, wherein the first compositing is performed by:
  processing fragments for sets of fragments in depth order;
  maintaining accumulated values for intermediate values of sets of fragments, in the binary tree; and
  adjusting the binary tree based on fragments encountered, such that a plurality of the intermediate colors are determined for use in the second compositing.

8. A computer-readable medium, for use with a computer-implemented image generation system, wherein image elements are provided to a processor for rendering into an image and wherein at least some of the image elements correspond to fragments, the computer-readable medium having stored thereon, in non-transitory form, program code, executable, directly or indirectly, comprising:
  program code for determining, for each of a set of fragments, characteristics of the fragment, wherein characteristics comprise at least a position of the fragment in a three-dimensional virtual space, at least one color of the fragment, and at least one alpha value for at least one portion of the fragment;
  program code for determining, for at least two fragments of the set of fragments, a fragment placement order in which simulated placement is represented;
  program code for determining, for each of at least a plurality of pixels, a pixel color value comprising:
    (a) program code for determining a set of intersecting fragments for that pixel, wherein the intersecting fragments are the fragments from the set of fragments that intersect a view ray for that pixel;
    (b) program code for assigning an intermediate color to each of the fragments in the set of intersecting fragments, different than the initial color of the fragment for at least one fragment, wherein the assigned intermediate color corresponds to a first compositing of nearby fragments in placement order, wherein the fragments are simulated paint strokes, wherein the placement order corresponds to an order of simulated paint strokes being applied to the image, and wherein assigning the intermediate color to each of the fragments in the set of intersecting fragments comprises:
      assigning a distinct stroke number to each of the fragments, wherein the stroke number identifies the placement order in which the fragment was created;
      generating a binary tree having a plurality of nodes, wherein the plurality of nodes comprise a leaf node for each of the fragments and at least one internal node, wherein the at least one internal node comprises a composite of its children nodes, and wherein each of the plurality of nodes comprises a color value and an alpha value; and
    (c) program code for assigning a color to the pixel that corresponds to a second compositing of the fragments using the intermediate colors assigned to the fragments, wherein the second compositing is done in depth order.

9. The computer-readable medium of claim 8, further comprising:
  program code for determining, for each pixel, which of a set of simulated paint strokes intersects a view ray for that pixel; and
  program code for determining, for at least a plurality of the intersecting simulated paint strokes, a depth order with respect to the view ray and a stroke order among the plurality of the intersecting simulated paint strokes.

10. The computer-readable medium of claim 9, further comprising program code for defining the intermediate colors by sweeping across a depth to compute values of intermediate functions and intermediate colors incrementally.

11. The computer-readable medium of claim 8, further comprising:
  program code for obtaining a user-specified depth window size; and
  program code for adjusting grouping of nearby fragments in the first compositing based on the user-specified depth window size, such that two fragments adjacent in depth but separated by more than the user-specified depth window size are placement-order composited separately from each other.

12. The computer-readable medium of claim 11, wherein the program code for assigning an intermediate color comprises program code for compositing with the depth window using a box filter.

13. The computer-readable medium of claim 12, wherein the box filter has a band width proportional to a depth window width and proportional to a user-specified smoothing parameter.

14. The computer-readable medium of claim 8, wherein the program code for assigning an intermediate color comprises:
  program code for processing fragments for sets of fragments in depth order;

program code for maintaining accumulated values for intermediate values of sets of fragments, in the binary tree; and program code for adjusting the binary tree based on fragments encountered, such that a plurality of the intermediate colors are determined for use in the second compositing.

15. A rendering system for generating representations of images based in part on user inputs, comprising:

a processor for executing instructions and modifying stored data structures;

memory for storing the data structures;

a display, coupled to the processor, for providing visual representations of at least some image elements stored in the data structures, wherein at least some of the image elements correspond to fragments;

an input device for accepting a plurality of input elements corresponding to fragments;

storage for parameters of a compositing process, including, for each of a set of fragments, a position of the fragment in a three-dimensional virtual space, at least one color, and at least one alpha value for at least one portion of the fragment, and a placement parameter for the fragment;

storage for intermediate color values for sets of nearby fragments, wherein a set of nearby fragments comprises fragments of the set of fragments that intersects a view ray for a pixel and an intermediate color value is a value determined according to an intersection of a fragment and the view ray, the intermediate color value being different than the initial color of the fragment for at least one fragment, wherein the assigned intermediate color corresponds to a first compositing of nearby fragments in placement order, wherein placement order is determined by comparison of placement parameters, wherein the fragments are simulated paint strokes, wherein the placement order corresponds to an order of simulated paint strokes being applied to the image, and wherein determining the intermediate color of each of the fragments in the set of intersecting fragments comprises:

assigning a distinct stroke number to each of the fragments, wherein the stroke number identifies the placement order in which the fragment was created;

generating a binary tree having a plurality of nodes, wherein the plurality of nodes comprise a leaf node for each of the fragments and at least one internal node, wherein the at least one internal node comprises a composite of its children nodes, and wherein each of the plurality of nodes comprises a color value and an alpha value; and storage for pixel color values for each of at least a plurality of pixels, a pixel color value corresponding to a second compositing of the fragments using the intermediate colors assigned to the fragments, wherein the second compositing is done in depth order.

16. The rendering system of claim 15, further comprising, for each pixel:

determining which of a set of simulated paint strokes intersects a view ray for that pixel; and for at least a plurality of the intersecting simulated paint strokes, determining a depth order with respect to the view ray and a stroke order among the plurality of the intersecting simulated paint strokes.

17. The rendering system of claim 15, further comprising storage for accumulated intermediate color values determined by sweeping across a depth to compute values of intermediate functions and intermediate colors incrementally.

18. The rendering system of claim 15, further comprising storage for a user-specified depth window size, wherein the rendering system includes logic for adjusting grouping of nearby fragments in the first compositing based on the user-specified depth window size, such that two fragments adjacent in depth but separated by more than the user-specified depth window size are placement-order composited separately from each other.

19. The rendering system of claim 18, wherein the intermediate colors are composited with the depth window using a box filter.

20. The rendering system of claim 18, wherein the box filter is a box filter with a bandwidth proportional to a depth window width and proportional to a user-specified smoothing parameter.

21. The rendering system of claim 15, further comprising storage for the binary tree usable for providing intermediate values when processing fragments for sets of fragments in depth order, maintaining accumulated values for the intermediate values of sets of fragments in the binary tree and adjusting the binary tree based on fragments encountered, such that a plurality of the intermediate colors are determined for use in the second compositing.

* * * * *